United States Patent
Nose et al.

(10) Patent No.: US 7,315,313 B2
(45) Date of Patent: Jan. 1, 2008

(54) CONTROLLER/DRIVER FOR DRIVING DISPLAY PANEL

(75) Inventors: Takashi Nose, Kanagawa (JP); Hirobumi Furihata, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 613 days.

(21) Appl. No.: 10/956,158

(22) Filed: Oct. 4, 2004

(65) Prior Publication Data

US 2005/0073470 A1 Apr. 7, 2005

(30) Foreign Application Priority Data

Oct. 2, 2003 (JP) .............................. 2003-344924

(51) Int. Cl.
G09G 3/36 (2006.01)
G09G 5/10 (2006.01)
(52) U.S. Cl. ........................... 345/690; 345/88; 345/89
(58) Field of Classification Search ................ 345/690, 345/87–102
See application file for complete search history.

(56) References Cited

U.S. PATENT DOCUMENTS 7,038,702 B2 * 5/2006 Kudo et al. .................. 345/690
7,148,868 B2 * 12/2006 Lee .............................. 345/87

FOREIGN PATENT DOCUMENTS

JP 2002-287709 10/2002

* cited by examiner

Primary Examiner—Duc Q Dinh
(74) Attorney, Agent, or Firm—Young & Thompson

(57) ABSTRACT

A controller/driver for driving main and sub display panels is composed of first and second memory sections, a color reduction circuit, and a data line driver circuit. The first and second memory sections are used as multipurpose display memories. When the controller/driver is placed in a first mode, the first and second memory sections store therein a pair of image data color-reduced under different conditions for achieving frame rate control. When the controller/driver is placed in a second mode, on the other hand, the first and second memory sections store sub and main image data respectively associated with images to be displayed on main and sub display panels.

15 Claims, 13 Drawing Sheets

CONTROLLER/DRIVER FOR DRIVING DISPLAY PANEL

BACKGROUND OF THE INVENTION

1. Field of the Invention

The present invention is generally related to controller/drivers and display device including the same, more particularly, to controller/drivers adapted to color reduction.

2. Description of the Related Art

Controller/drivers are used for driving display panels, including liquid crystal display panes. Controller/drivers may be mechanically separated from the display panel, or integrated on the display panel typically using a chip-on-glass (COG) technique.

Controller/drivers are desired to display high quality images on the display panels. Such requirement may be satisfied by using a display panel adapted to an increased number of colors, and a controller/driver adapted to pixel data composed of increased data bits for each pixel.

However, this approach is not suitable for controller/drivers and display panels disposed within portable devices, including cell phones and PDAs (personal data assistant), because various technical limits are imposed on such controller/drivers and display panels. One requirement imposed on controller/drivers and display panels for portable devices is reduction in power consumption, and another is reduction in mounting space. In order to reduce power consumption, display panels for portable devices, especially LCDs, are not allowed to display an increased number of colors. Additionally, it is undesirable for controller/drivers within portable devices to include a display memory having an increased capacity for storing increased pixel data, from the viewpoint of power consumption and mounting space. Therefore, controller/drivers within portable devices require special techniques for achieving high quality images.

Japanese Open Laid Patent Application No. P2002-287709 discloses a controller driver suitable for portable devices, which achieves displaying high quality images. The disclosed controller/driver is composed of a circuit for color reduction based on dithering or error diffusion. Such architecture allows the controller/driver to display high quality images using a display memory with a reduced capacity.

Recently, however, user's requirements include further improvement in image quality, and therefore conventional color reduction based on dithering and error diffusion does not satisfy such user's requirements. Users of portable devices now desire to display photograph images on the display, and this necessitates considerably high image quality. Nevertheless, color reduction based on conventional dithering suffers from granular noise, while color reduction based on conventional error diffusion suffers from unpleasant moiré patterns. Therefore, there is a need for providing a controller driver which achieves sophisticated color reduction for improving image quality.

Additionally, controller/drivers are desired to be multifunctional. When a portable device is installed with multiple LCDs, the LCDs are desirably driven by using a single controller/driver. Driving multiple LCDs with a single controller/driver effectively simplifies the routing of the wirings within the portable device.

In another aspect, controller/drivers are desirably adapted to various image formats other than the bitmap format. One drawback of the bitmap format is large data size, and this drawback is serious for controller/drivers for portable devices. Receiving image data with increased data size undesirably increases power consumption of controller/drivers, because controller/drivers require power for receiving data bits. One approach for solving this drawback is transferring images with an image form other than the bitmap form, which allows reduction in the image data size. For example, transferring images with the vector form or the JPEG form is a promising technique for reducing power consumption of controller/drivers. It should be noted that, to the inventors' knowledge, no prior art discloses a display device which transfers images to a controller/driver using an image format other than the bitmap form.

These requirements are desirably satisfied along with the reduction in the power consumption and mounting space, including the reduction in the capacity of the display memory incorporated within the controller/driver. Therefore, there is a need for providing a multifunctional controller/driver which achieves high quality images along with the reduction in the display memory capacity.

SUMMARY OF THE INVENTION

Accordingly, an object of the present invention is to provide a multifunctional controller/driver which achieves high quality images along with the reduction in the display memory capacity.

In order to achieve this object, the present invention generally addresses a controller/driver including first and second multipurpose memory sections. The first and second memory sections are used for different image data depending on an operation mode into which the controller/driver is placed.

Specifically, in an aspect of the present invention, a controller/driver for driving main and sub display panels is composed of first and second memory sections a color reduction circuit, and a data line driver circuit. When the controller/driver is placed in a first mode, the color reduction circuit offers color-reduction under a first condition for externally received input image data to develop first color-reduce image data, and offers color-reduction under a second condition different from the first condition for the input image data to develop second color-reduced image data, and the first and second memory sections store therein the first and second color-reduced image data, respectively. Additionally, when the controller/driver is placed in a first mode, the data line driver circuit drives one of the main and sub display panels in response to one of the first and second color-reduced image data at a first frame, and drives the one of the main and sub display panels in response to another of the first and second color-reduced image data at a second frame following the first frame. When the controller/driver is placed in a second mode, on the other hand, the first memory section stores therein main image data associated with a main image to be displayed on the main display panel, and the second memory section stores therein sub image data associated with a sub image to be displayed on the sub display panel. Additionally, when the controller/driver is placed in the second mode, the data line driver circuit drives the main display panel in response to the main image data stored in the first memory section, and drives the sub display panel in response to the sub image data stored in second first memory section.

In the controller/driver thus constructed, the second memory section is adapted to store the image data used for driving the sub display panel, and also to store the second color-reduced image data used for achieving image quality enhancement through frame rate control. This architecture effectively achieves high quality image on the main display panel with the reduced memory resource.

In another aspect of the present invention, a controller/driver for driving a display panel is composed of first and second memory sections, a color-reduction circuit, an image processor, and a data line driver circuit. When the controller/driver is placed into a first mode, the color-reduction circuit offers color-reduction under a first condition for input image data in a bitmap form to develop first color-reduced image data, and offers color-reduction under a second condition different from the first condition for the input image data to develop second color-reduced image data, and the first and second memory sections store therein the first and second color-reduced image data, respectively. Additionally, when the controller/driver is placed into the first mode, the data line driver circuit drives the display panel in response to one of the first and second color-reduced image data at a first frame, and drives the display panel in response to another of the first and second color-reduced image data at a second frame following the first frame. When the controller/driver is placed into a second mode, on the other hand, the image processor converts another input image data in a form different from the bitmap form into corresponding bitmap data using the first memory section as a work area, and develops the corresponding bitmap data onto the first memory section, and the second memory section receives the bitmap data from the first memory section to store therein. Additionally, when the controller/driver is placed into the second mode, the data line driver circuit drives the display panel in response to the bitmap data stored in the second memory section.

In the controller/driver thus-constructed, the first memory section is used as a storage area for storing first color-reduced image data used for achieving image quality enhancement through frame rate control, and also used as a work area used for converting another input image data in a form other than the bitmap form into the corresponding bitmap data. This architecture effectively achieves high quality image on the main display panel with the reduced memory resource.

In still another aspect of the present invention, a display device is composed of a processor, a display panel, and a controller/driver driving the display panel in response to input image data received from the processor, the input image data is represented in a bitmap form. The controller/driver includes a color-reduction circuit generating first color-reduced image data through applying color reduction to the input image data under a first condition, and generating second color-reduced image data through applying color reduction to the input image data under a second condition different from the first condition, a first memory section storing the first color-reduced image data, a second memory section storing the second color-reduced image data, and a data line driver circuit driving the display panel in response to one of the first and second color-reduced image data at a first frame, and driving the display panel in response to another of the first and second color-reduced image data at a second frame following the first frame.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art would recognize that many alternative embodiments can be accomplished using the teachings of the present invention and that the invention is not limited to the embodiments illustrated for explanatory purposes.

First Embodiment

1. Display Device Structure

Figure 1:
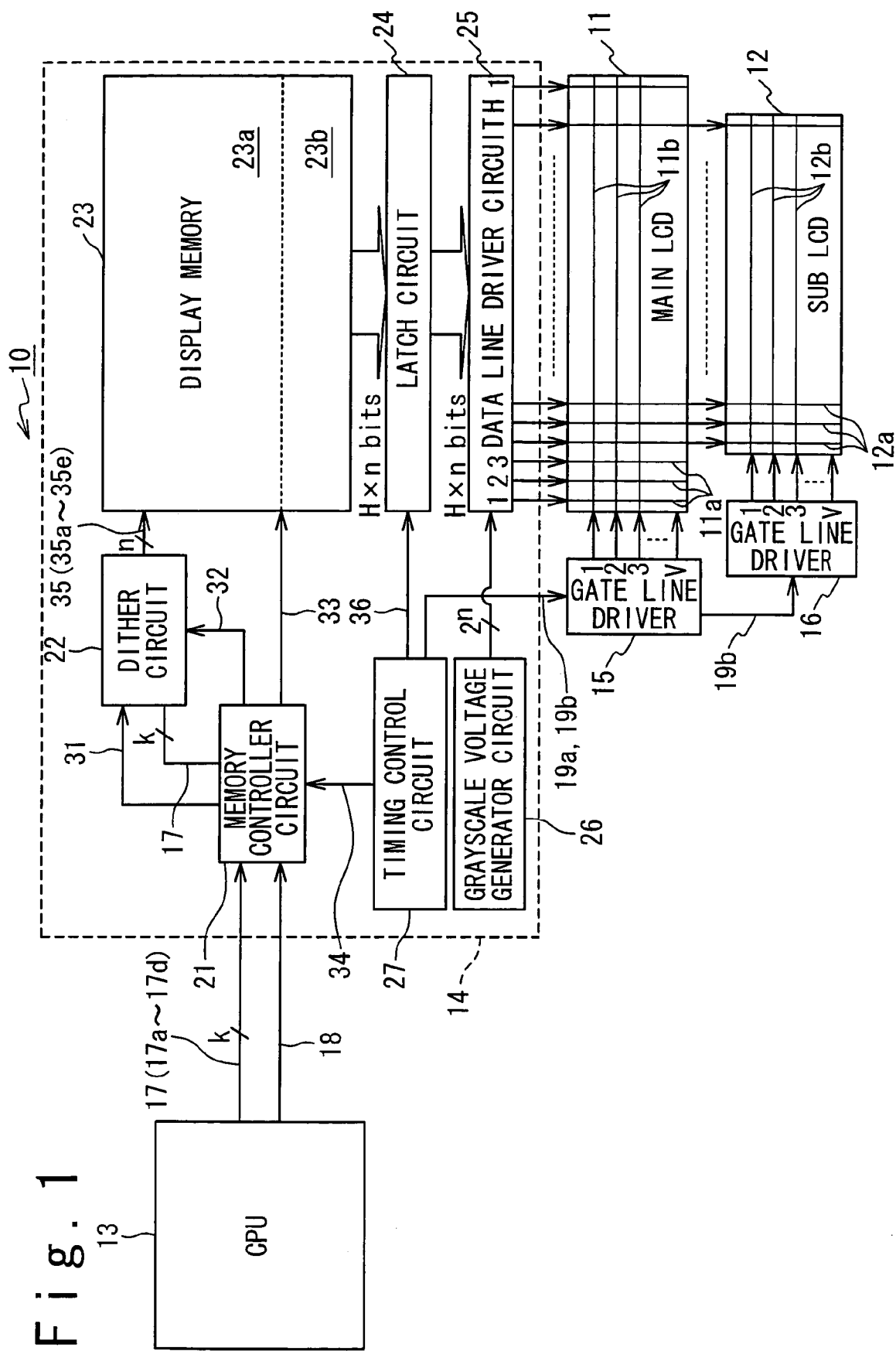
FIG. 1 is a block diagram illustrating an exemplary structure of a display device including a controller/driver in accordance with a first embodiment of the present invention.

FIG. 1 is a block diagram illustrating an exemplary structure of a display device 10 in a first embodiment. The display device 10 is composed of a main LCD panel 11, a sub LCD panel 12, a CPU (central processing unit) 13, a controller/driver 14, and a pair of gate line drivers 15 and 16.

The main LCD panel 11 is composed of $H_1$ data lines 11a disposed to extend in the y-axis direction (the vertical direction), and $V_1$ gate lines 11b disposed to extend in the x-axis direction (the horizontal direction); it should be noted that $H_1$ designates the number of the data lines 11a, and $V_1$ designates the number of the gate lines 11b. Pixels are disposed at the respective intersections of the data lines 11a and the gate lines 11b. In other words, the main LCD panel 11 includes pixels arranged in $V_1$ rows and $H_1$ columns.

Correspondingly, the sub LCD panel 12 is composed of $H_2$ data lines 12a disposed to extend in the y-axis direction, and $V_2$ gate lines 12b disposed to extend in the x-axis direction. The sub LCD panel 12 includes pixels arranged in $V_2$ rows and $H_2$ columns at the respective intersections of the data lines 12a and the gate lines 12b. The $H_2$ data lines 12a of the sub LCD panel 12 are respectively connected to $H_2$ data lines selected out of the $H_1$, data lines 11a of the main LCD panel 11. As described later, the controller/driver 14 is designed to drive the data lines 12a of the sub LCD panel 12 through the data lines 11a of the main LCD panel 11.

The CPU 13 provides the controller/driver 14 with input image data 17 representing images to be displayed on the main and sub LCD panels 11 and 12. The input image data 17 is k-bit grayscale bitmap data (that is, $2^k$ grayscale bitmap data), which represents the graylevel of each pixel by using k data bits. The CPU 13 is also develops a control signal 18 to control the controller/driver 14.

The controller/driver 14 drives the data lines 11a and 12a of the main and sub LCD panels 11 and 12 in response to the input image data 17, under the control of the CPU 13. Additionally, the controller/driver 14 develops timing control signals 19a and 19b for controlling the operation timings of the gate line drivers 15 and 16.

The controller/driver 14 has two operation modes: a normal mode, and an image quality enhance mode. When being placed in the normal mode, the controller/driver 14 drives selected one or both of the main and sub LCD panels 11 and 12 with the normal image quality. When being placed in the image quality enhance mode, on the other hand, the controller/driver 14 selectively enhances the image quality of a selected portion of the main LCD panel 11; the controller/driver 14 drives the remaining portion of the main LCD panel 11 with the normal image quality. Within the main LCD panel 11, the selected portion driven with the enhanced image quality may be referred to as an enhanced image quality region, and the remaining portion may be referred to as a normal image quality region. When the controller/driver 14 is placed in the image quality enhance mode, the sub LCD panel 12 is deactivated, and no image is displayed on the sub LCD panel 12. The operation mode of the controller/driver 14 is controlled using the control signal 18.

The gate line drivers 15 and 16 are used for driving the gate lines of the main and sub LCD panels 11 and 12, respectively. The gate line driver 15 is responsive to the timing control signal 19a received from the controller/driver 14 for scanning the gate lines 11b of the main LCD panel 11. Correspondingly, the gate line driver 16 is responsive to the timing control signal 19b for scanning the gate lines 12b of the sub LCD panel 12.

2. Controller/Driver Structure

The controller/driver 14 is composed of a memory controller circuit 21, a dither circuit 22, a display memory 23, a latch circuit 24, a data line driver circuit 25, a grayscale voltage generator circuit 26, and a timing control circuit 27.

The memory controller circuit 21 is designed to transfer the input image data 17 received from the CPU 13 to the dither circuit 22, and to control the dither circuit 22 and the display memory 23. More specifically, the memory controller circuit 21 has functions as follows:

(1) a function of sequentially transferring pixel data within the input image data 17 to the dither circuit 22;

(2) a function of providing coordinate data 31 representative of the x and y coordinates of the pixel associated with the transferred pixel data;

(3) a function of providing a matrix switch signal 32 instructing a dither matrix to be used by the dither circuit 22; and (4) a function of developing a display memory control signal 33 in response to the control signal 18 received from the CPU 13, and a timing control signal 34 received from the timing control circuit 27.

The display memory control signal 33 may include an address signal representative of the access location of the display memory 23, a row address strobe (RAS) signal, and a column address strobe (CAS) signal, and so forth. The access and operation timings of the display memory 23 are controlled by these control signals.

The dither circuit 22 offers r-bit color reduction through dithering for the input image data 17 to develop a color-reduced image data 35, r being an integer less than k. The color-reduce image data 35 is n-bit bitmap data (that is, $2^n$ grayscale bitmap data), where n is k minus r. In other words, the color-reduced image data 35 represents the graylevel of each pixel by using n data bits. The dither circuit 22 achieves dithering using a specific (r, r) dither matrix, and the coordinate data 31, which is representative of x and y coordinates of each pixel. The dither circuit 22 selects one of two dither matrixes $A_1$, and $A_2$ in response to the matrix switch signal 32, and achieves dithering of the input image data 17 using the selected dither matrix. When the matrix switch signal 32 is set to logic "0", the dither circuit 22 selects the dither matrix $A_1$ for achieving dithering. When the matrix switch signal 32 is set to logic "1", on the other hand, the dither circuit 22 selects the dither matrix $A_2$.

The display memory 23 stores therein the color-reduced image data 35 received from the dither circuit 22. A main region 23a and a sub region 23b are defined within the display memory 23. The main region 23a has a capacity of $H_1 \times V_1 \times n$ bits, while the sub region 23b has a capacity of $H_1 \times V_2 \times n$ bits; $H_1$ is the number of the pixel columns of the main LCD panel 11, $V_1$ is the number of the pixel rows of the main LCD panel 11, and $V_2$ is the number of the pixel rows of the sub LCD panel 12. This implies that the main region 23a has a capacity sufficient to store the pixel data of all the pixels within the main LCD panel 11, and the sub region 23b has a capacity sufficient to store the pixel data of all the pixels within the sub LCD panel 12. The display memory 23 is configured to include $H_1 \times n$ bit lines, and to output $H_1 \times n$ data bits at the same time through the bit lines, the $H_1 \times n$ data bits being the pixel data associated with selected one pixel row, including $H_1$ pixels, of the main LCD panel 11.

As described later, the sub region 23b within the display memory 23 is used for two purposes: one purpose is to store image data associated with the image to be displayed on the sub LCD panel 12, and another is to store image data used for the enhancement of the image quality of the main LCD panel 11 using a frame rate control technique. This allows the controller/driver 14 to achieve both of the enhancement of the image quality and the concurrent drive of multiple LCD panels with the reduced display memory size.

The latch circuit 24, the data line driver circuit 25, and the grayscale voltage generator circuit 26 are used as a drive section for driving the main LCD panel 11, and/or the sub LCD panel 12, in response to the color-reduced image data 35. The latch circuit 24 latches the pixel data of $H_1 \times n$ bits received from the display memory 23 in response to a latch signal received from the timing control circuit 27, and transfers the latched pixel data to the data line driver circuit 25. The grayscale voltage generator circuit 26 provides the data line driver circuit 25 with $2^n$ voltages respectively associated with the $2^n$ graylevels representable on the main and sub LCD panels 12 and 13. The data line driver circuit 25 selects one of the $2^n$ voltages for each pixel in response to the associated pixel data, and develops the selected voltage onto the associated data line 11a within the main LCD panel 11, or onto the associated data line 12a within the sub LCD panel 12 through the associated data line 11a for each pixel.

The timing control circuit 27 provides timing control for the memory controller circuit 21, the display memory 23, the latch circuit 24 within the controller/driver 14, and for the gate line drivers 15 and 16. More specifically, the timing control circuit 27 provides a timing control signal 34 for the memory controller circuit 12, and thereby controls write and read timings of the display memory 23. Additionally, the timing controller 27 generates the latch signal 36 to output the latch circuit 24, and thereby controls data latch timing for the latch circuit 24. Finally, the timing control circuit 27 provides a control signals 19a and 19b for the gate line driver 15 and 16, and thereby controls the activation timing of the gate lines 11b within the main LCD panel 11, and the gate lines 12b within the sub LCD panel 12. The frame rate at which images are displayed on the main LCD panel 11 is controllable by the timing control signal 34, the latch signal 36, and the control signals 19a and 19b.

3. Structure of Dither Circuit

Figure 2:
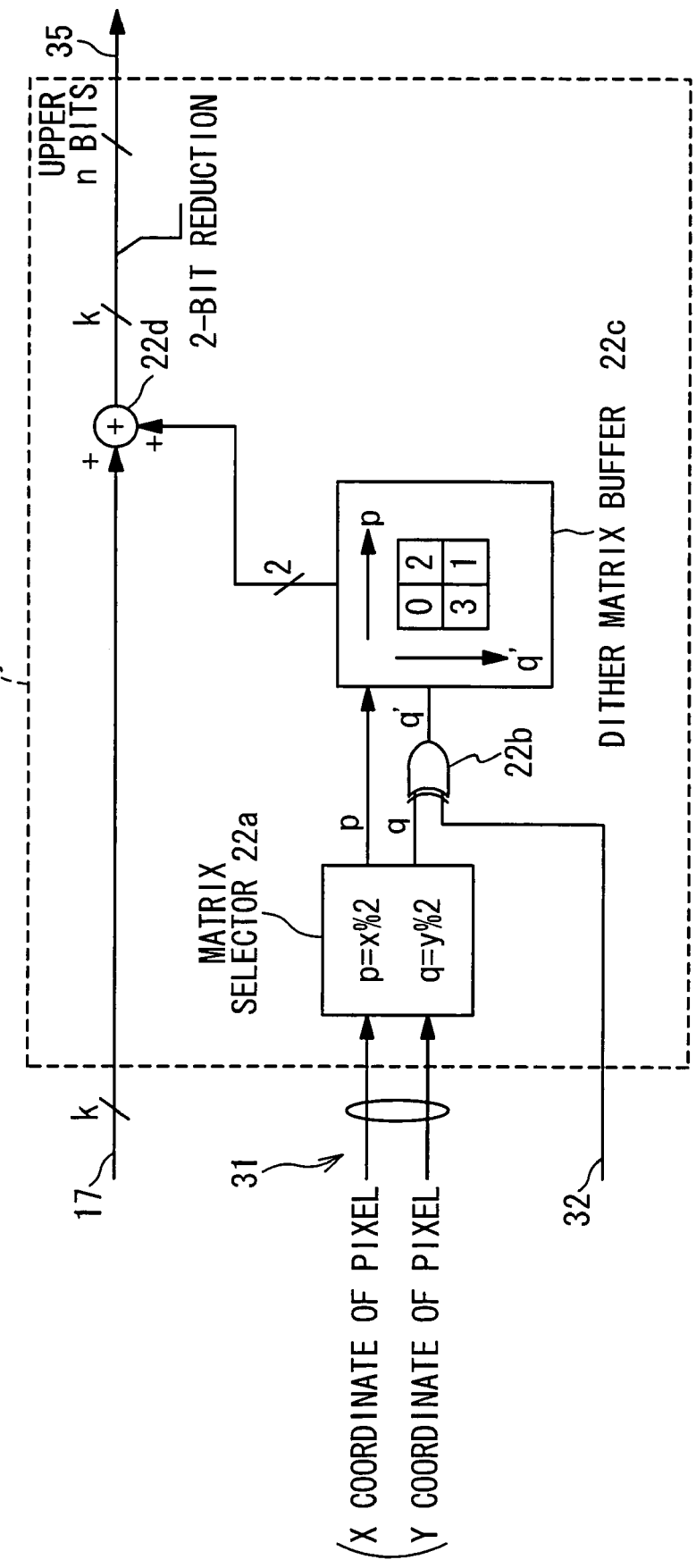
FIG. 2 is a block diagram illustrating an exemplary structure of a dither circuit within the controller/driver in the first embodiment.

FIG. 2 is a block diagram illustrating an exemplary structure of the dither circuit 22 configured to achieve 2-bit color-reduction, assuming that r (=k−n) is two. The dither circuit 22 is composed of a matrix selector 22a, an XOR gate 22b, and a dither matrix buffer 22c, and an adder 22d. The dither circuit 22 receives k-bit pixel data for each pixel, the data bits of the k-bit pixel data being inputted to the dither circuit 22 in parallel. Additionally, the dither circuit 22 receives x and y coordinates of each pixel. The matrix selector 22a calculates a remainder p obtained by dividing the x coordinate of the pixel by two, and a remainder q obtained by dividing the y coordinate of the pixel by two. The remainders p and q are each the value selected out of "0" and "1". The XOR gate 22b generates a logical value q' which is an XOR of the remainder q and the logical value of the matrix switch signal 32. The dither matrix buffer 22c contains therein a 2×2 bayer matrix A; the (i, j) element of the bayer matrix A is referred to as $a_{ij}$, which is each 2-bit data. Upon receiving the remainder p and the logical value q', the dither matrix buffer 22c outputs the element $a_{pq}$, which is the (p, q) element of the bayer matrix A. The adder 22d adds the output of the dither matrix buffer 22c to the input image data 17. The upper n data bits of the output of the adder 22d are retrieved as the color-reduced image data 35.

This architecture allows the dither circuit 22 to offer dithering for the input image data 17 using selected one of the dither matrixes $A^1$, $A^2$, which are represented by the following equations:

$$A^1 = \begin{pmatrix} a_{11} & a_{12} \\ a_{21} & a_{22} \end{pmatrix}, \quad A^2 = \begin{pmatrix} a_{21} & a_{22} \\ a_{11} & a_{12} \end{pmatrix}$$

4. Display Device Operation

As described above, the controller/driver 14 has two operation modes: the normal mode and the image quality enhance mode. When being placed into the normal mode, the controller/driver 14 drives the sub LCD panel 12 as well as the main LCD panel 11. When being placed into the image quality enhance mode, on the other hand, the controller/driver 14 drives selected portion of the main LCD panel 11 with high quality, with the sub LCD panel 12 deactivated. The operations of the controller/driver 14 are described below in detail for the normal mode and the image quality enhance mode.

(4-1) Normal Mode Operation

Figure 3:
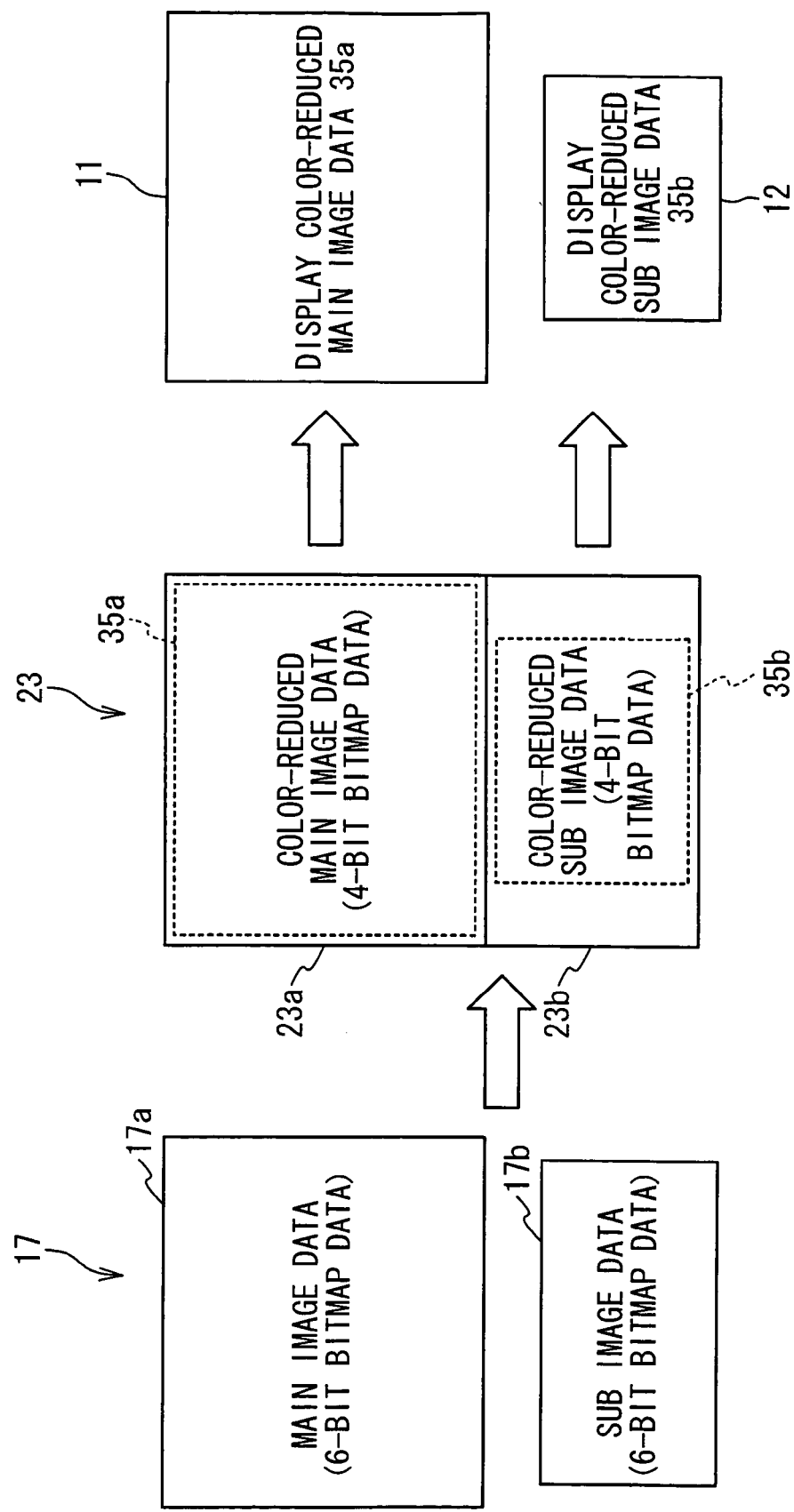
FIG. 3 is a schematic illustrating an exemplary operation of the display device in the first embodiment, when the controller/driver is placed into a normal mode.

FIG. 3 illustrates the operation of the display device 10 when the controller/driver 14 is placed into the normal mode. The CPU 13 indicates the controller/driver 14 to activate the sub LCD panel 12 using the control signal 18. In response to the control signal 18, the controller/driver 14 is placed into the normal mode.

Additionally, the CPU 13 generates the input image data 17 so that the input image data 17 includes main image data 17a representative of an image to be displayed on the main LCD panel 11, and sub image data 17b representative of an image to be displayed on the sub LCD panel 12. The CPU 13 then provides the input image data 17 for the controller/driver 14.

In response to the controller/driver 14 being placed into the normal mode, the memory controller circuit 21 sets the matrix switch signal 32 to logical value 0, and thereby indicates the dither circuit 22 to select the dither matrix $A^1$. Additionally, the memory controller circuit 21 transfers the coordination data 31, and the input image data 17 that includes the main and sub image data 17a and 17b, to the memory controller circuit 21.

The dither circuit 22 applies dithering to each of the main and sub image data 17a and 17b, and thereby develops color-reduced main image data 35a and color-reduced sub image data 35b. The color-reduced main image data 35a is obtained through dithering of the main image data 17a while the color-reduced sub image data 35b is obtained through dithering of the sub image data 17b. The dither circuit 22 develops the color-reduced image data 35 to include the color-reduced main and sub image data 35a and 35b, and provides the color-reduced image data 35 for the display memory 23.

The display memory 23 stores the color-reduced main image data 35a into the main region 23a, and also stores the color-reduced sub image data 35b into the sub region 23b. In other words, when the controller/driver 14 is placed into the normal mode, the main region 23a is configured to store image data used for driving the main LCD panel 11, while the sub region 23b is configured to store image data used for driving the sub LCD panel 12.

The data line driver circuit 25 drives the data lines 11a within the main LCD panel 11 in response to the color-reduced main image data 35a, and also drives the data lines 12a of the sub LCD panel 12 in response to the color-reduced sub image data 35b. As described above, the data lines 12a within the sub LCD panel 12 are driven through the data lines 11a within the main LCD panel 11. In synchronization with the drive of the data lines 11a and 12a, the gate line drivers 15 and 16 drive the gate lines 11b and 12b within the main and sub LCD panels 11 and 12. This achieves displaying the images represented by the main and sub image data 17a and 17b on the main and sub LCD panels 11 and 12, respectively.

4-2) Image Quality Enhance Mode Operation

Figure 4:
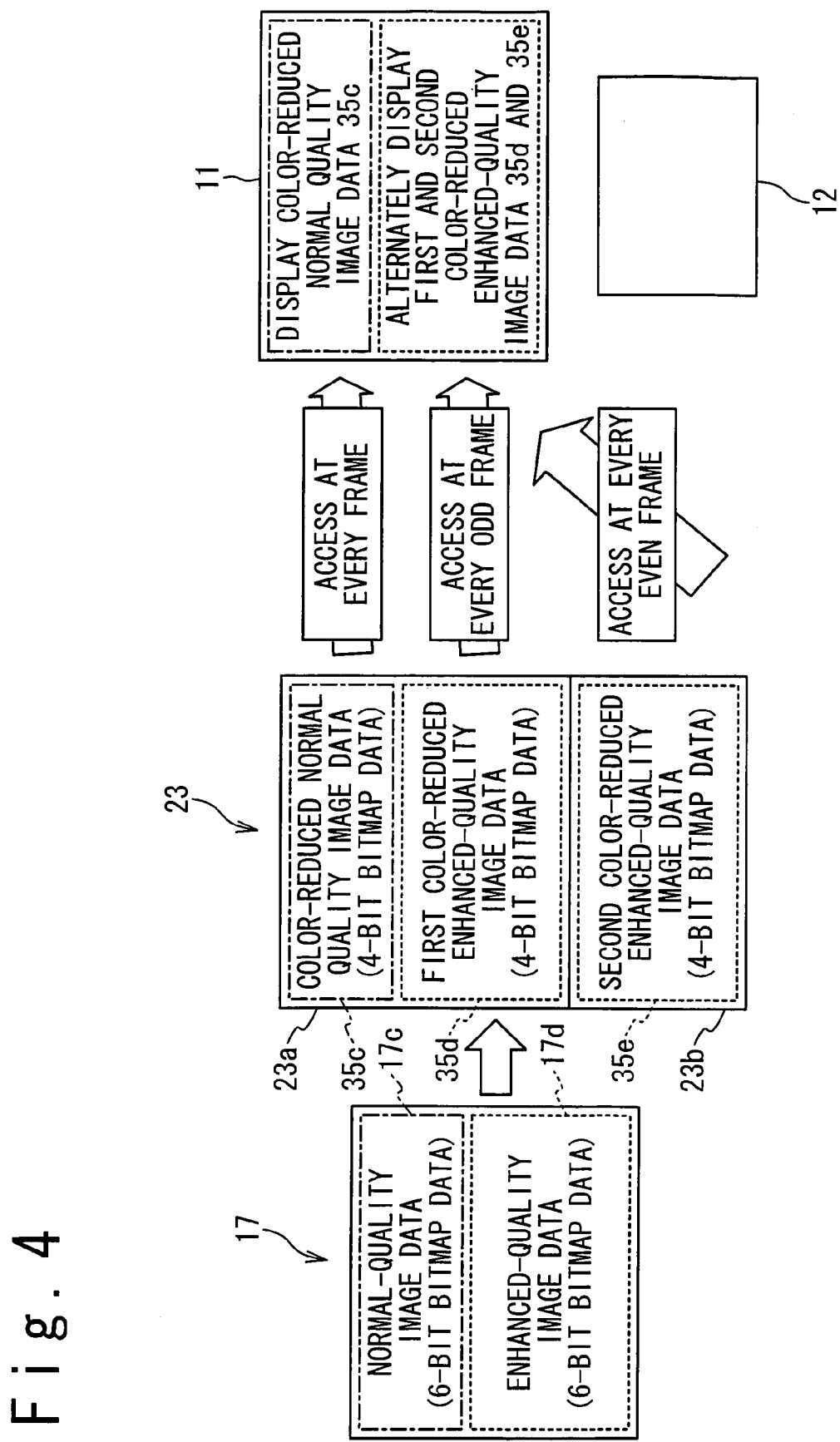
FIG. 4 is a schematic illustrating an exemplary operation of the display device in the first embodiment, when the controller/driver is placed into an image quality enhance mode.

FIG. 4 illustrates the operation of the display device 10 when the controller/driver 14 is placed into the image quality enhance mode. The CPU 13 indicates the controller/ driver 14 to display a high quality image on the selected portion of the main LCD panel 11 using the control signal 18. The controller/drive 14 is placed into the image quality enhance mode in response to the control signal 18.

Additionally, the CPU 13 generates the input image data 17 so that the input image data 17 includes normal quality image data 17c and enhanced quality image data 17d, the normal quality image data 17c being representative of an image to be displayed on the normal image quality region of the main LCD panel 11, and the enhanced quality image data 17d being representative of an image to be displayed on the enhanced image quality region of the main LCD panel 11. The CPU 13 then provides the controller/driver 14 with the input image data 17, including the normal-quality image data 17c and the enhanced-quality image data 17d. It should be noted that the CPU 13 does not provide the controller/driver 14 with image data for the sub LCD panel 12. The memory controller circuit 21 sequentially transfers the normal quality image data 17c and the enhanced quality image data 17d, received from the CPU 13, to the dither circuit 22.

The dither circuit 22 applies dithering to the normal-quality image data 17c and the enhanced quality image data 17d. More specifically, the dither circuit 22 applies dithering to the normal-quality image data 17c with the dither matrix $A^1$ to thereby develop color-reduced normal-quality image data 35c. Additionally, the dither circuit 22 applies dithering to the enhanced-quality image data 17d with the dither matrix $A^1$ to thereby develop first color-reduced enhanced-quality image data 35d, and also applies dithering to the enhanced-quality image data 17d with the dither matrix $A^2$ to thereby develop second color-reduced enhanced-quality image data 35e. The dither circuit 22 develops the color-reduced image data 35 to include the color-reduced normal-quality image data 35c, and the first and second color-reduced enhanced-quality image data 35d, and 35e to provide for the display memory 23.

More specifically, the dither circuit 22 develops the color-reduced normal-quality image data 35c, and the first and second color-reduced enhanced-quality image data 35d, and 35e as follows. When providing the normal quality image data 17c for the dither circuit 22, the memory controller circuit 21 sets the matrix switch signal 32 to logical value 0, and thereby indicates the dither circuit 22 to select the dither matrix $A_1$ for dithering. The dither circuit 22 applies dithering to the normal quality image data 17a using the dither matrix $A_1$ to develop the color-reduced normal-quality image data 35c. The color-reduced normal-quality image data 35c is stored in the main region 23a of the display memory 23.

When providing the enhanced quality image data 17d for the dither circuit 22, on the other hand, the memory controller circuit 21 switches the matrix switch signal 32 at the frequency twice as high as the frequency at which data bits of the enhanced quality image data 17d are inputted to the dither circuit 22. More specifically, the memory controller circuit 21 provides pixel data associated with a target pixel for the dither circuit 22 with the matrix switch signal 32 set to logical value 0. In response to the matrix switch signal 32 being set to logical value 0, the dither circuit 22 applies dithering to the target pixel using the dither matrix $A^1$. The resultant pixel data obtained through the dithering is stored in the main region 23a of the display memory 23. The memory controller circuit 21 then switches the matrix switch signal 32 to logical value 1. In response to the matrix switch signal 32 being set to logical value 1, the dither circuit 22 applies dithering to the target pixel using the dither matrix $A^2$. The resultant pixel data obtained through the dithering is stored in the sub region 23a of the display memory 23. The same goes for the other pixels. This procedure allows the dither circuit 22 to develop the first color-reduced enhanced-quality image data 35d through applying dithering to the enhanced quality image data 17d with the dither matrix $A^1$, and to develop the second color-reduced enhanced-quality image data 35e through applying dithering to the enhanced quality image data 17d with the dither matrix $A^2$.

The display memory 23 stores the color-reduced normal-quality image data 35c and the first color-reduced enhanced-quality image data 35d into the main region 23a, and also stores the second color-reduced enhanced-quality image data 35e into the sub region 23b.

The data line driver circuit 25 drives the data lines 11a within the main LCD panel 11 in response to the color-reduced normal-quality image data 35c, and the first and second color-reduced enhanced-quality image data 35d and 35e. In the meantime, the gate lines 11b are activated by the gate line driver 15 in synchronization with the drive of the data lines 11a at appropriate timings. This achieves driving the pixels within the normal image quality region of the main LCD panel 11 in response to the color-reduced normal-quality image data 35c, and also achieves driving the pixels within the enhanced image quality region in response to the first and second color-reduced enhanced-quality image data 35d and 35e.

This procedure allows the controller/driver 14 to display the image on the normal image quality region of the main LCD panel 11 with the normal quality. The color-reduced normal-quality image data 35c, which is generated through dithering with the dither matrix $A^1$, is retrieved from the display memory 23 at every frame, and the pixels within the normal image quality region are driven in response to the retrieved color-reduced normal-quality image data 35c. This achieves displaying the image associated with the normal quality image data 17c on the normal image quality region of the main LCD panel 11.

On the other hand, the image quality is enhanced through dithering and frame rate control within the enhanced image quality region of the main LCD panel 11. At a first frame, the first color-reduced enhanced-quality image data 35d, which is generated through dithering using the dither matrix $A^1$, is retrieved from the display memory 23, and the pixels within the enhanced image quality region are driven in response to the first color-reduced enhanced-quality image data 35d. At a second frame following the first frame, the second color-reduced enhanced-quality image data 35e, which is generated through dithering using the dither matrix $A^2$, is retrieved from the display memory 23, and the pixels within the enhanced image quality region are driven in response to the second color-reduced enhanced-quality image data 35e. The same goes for the following frames; at odd frames, the pixels within the enhanced image quality region are driven in response to the first color-reduced enhanced-quality image data 35d, while being driven in response to the first color-reduced enhanced-quality image data 35e at even frames. Alternately using the first and second color-reduced enhanced-quality image data 35d and 35e, which are generated with the different dither matrixes, effectively reduces the granular noise of images caused by the dithering, and thereby improves the image quality of the enhanced image quality region.

The controller/driver 14 may be configured to partially update the image displayed on the enhanced image quality region of the main LCD panel 11 as described in the following. Updating the image begins with providing the controller/driver 14 from the CPU 13 with differential image data associated with the portion of the image to be updated, and coordinate data representative of the coordinates of the pixels within the portion to be updated. The dither circuit 22 applies dithering to the differential image data using the dither matrixes $A^1$ and $A^2$, and thereby develops a pair of dithered differential image data. The portion of the main regions 23a of the display memory 23 associated with the portion to be updated is then overwritten to the dithered differential image data generated by using the dither matrix $A^1$, while the portion of the main regions 23a of the display memory 23 associated with the portion to be updated is overwritten to the dithered differential image data generated by using the dither matrix $A^2$. This procedure completes the partial update of the image displayed on the enhanced image quality region of the main LCD panel 11. The architecture for partially updating the image on the main LCD panel 11 through transmitting only the image data to be updated effectively reduces the power consumption; this enhances the use of the display device 10 in this embodiment for portable devices.

In summary, the controller/driver 14 in this embodiment, which makes use of the memory resource provided for driving multiple LCD panels, achieves improvement of the image quality using the dithering and the frame rate control with the reduced memory capacity. The controller/driver 14 uses the sub region 23b of the display memory 23 multi-purposely, for both storing the color-reduced sub image data 35b used for driving the sub LCD panel 12, and storing the second color-reduced enhanced-quality image data 35e used for displaying quality-enhanced images on the main LCD panel 11 through the dithering and frame rate control. This allows the controller/driver 14 to display enhanced-quality images on the main LCD panel 11, and to drive the multiple display panels with the reduced memory resource.

Additionally, the controller/driver 14 in this embodiment effectively achieves the improvement of the image quality through the dithering and frame rate control with reduced power consumption. Once generating and storing the first and second color-reduced enhance-quality image data 35d and 35e into the display memory 23, the controller/driver 14 does not require receiving image data from the CPU 13 at every frame for achieving the frame rate control. Such operation effectively reduces the data transmission from the CPU 13 to the controller/driver 14 while the controller/driver 14 implements the frame rate control. The reduction in the data transmission is effective for reducing the power consumption of the controller/driver 14. This is important especially when the display device 10 in this embodiment is installed within portable devices.

In this embodiment, the frame rate at which the main LCD panel 11 is refreshed when the controller/driver 14 is placed into the image quality enhance mode is higher than that when the controller/driver 14 is placed into the normal mode. Increasing the frame rate allows the images generated by using different dither matrixes to be switched at a high frequency, and to thereby make the structured noise hard to be perceived. This effectively improves the image quality; however, the increase in the frame rate undesirably increases the power consumption. In order to achieve improved image quality with reduced power consumption, the frame rate is preferably controlled so that the frame rate is increased when the enhanced image quality is required, that is, when the controller/driver 14 is placed into the image quality enhance mode, while the frame rate is decreased when the controller/driver 14 is placed into the normal mode.

The dither matrixes $A^1$ and $A^2$, which are used for generating the color-reduced image data 35, are configured so that the following equation is satisfied for arbitrary i, and j, which are natural numbers equal to or smaller than r:

$$a^1_{ij} + a^2_{ij} = \text{const.},$$

where $a^1_{ij}$ is the (i, j) element of the dither matrix $A^1$, and $a^2_{ij}$ is the (i, j) element of the dither matrix $A^2$ $a^1_{ij}$ is the (i, j) element of the dither matrix $A^1$. Displaying the images generated using the dither matrixes $A^1$ and $A^2$ thus configured allows the dithering errors to be uniformly distributed in terms of both the time and special domains. This effectively improves the image quality.

Although the enhanced image quality region is prepared within the main LCD panel 11 in this embodiment, the enhanced image quality region may be prepared within the sub LCD panel 12 in place of the main LCD panel 11. In this case, the main LCD panel 12 is deactivated in response to the controller/driver 14 being placed into the image quality enhance mode, and the whole of the sub LCD panel 12 is used as the enhanced image quality region.

Additionally, in an alternative embodiment, the sub region 23b within the display memory 23 may have the same capacitance as the main region 23a. In this case, the whole of the main LCD panel 11 may be used as the enhanced image quality region, when the controller/driver 14 is placed into the image quality enhance mode. Instead, the whole of the sub LCD panel 12 may be used as the enhanced image quality region.

Second Embodiment

1. Display Device Structure

Figure 5:
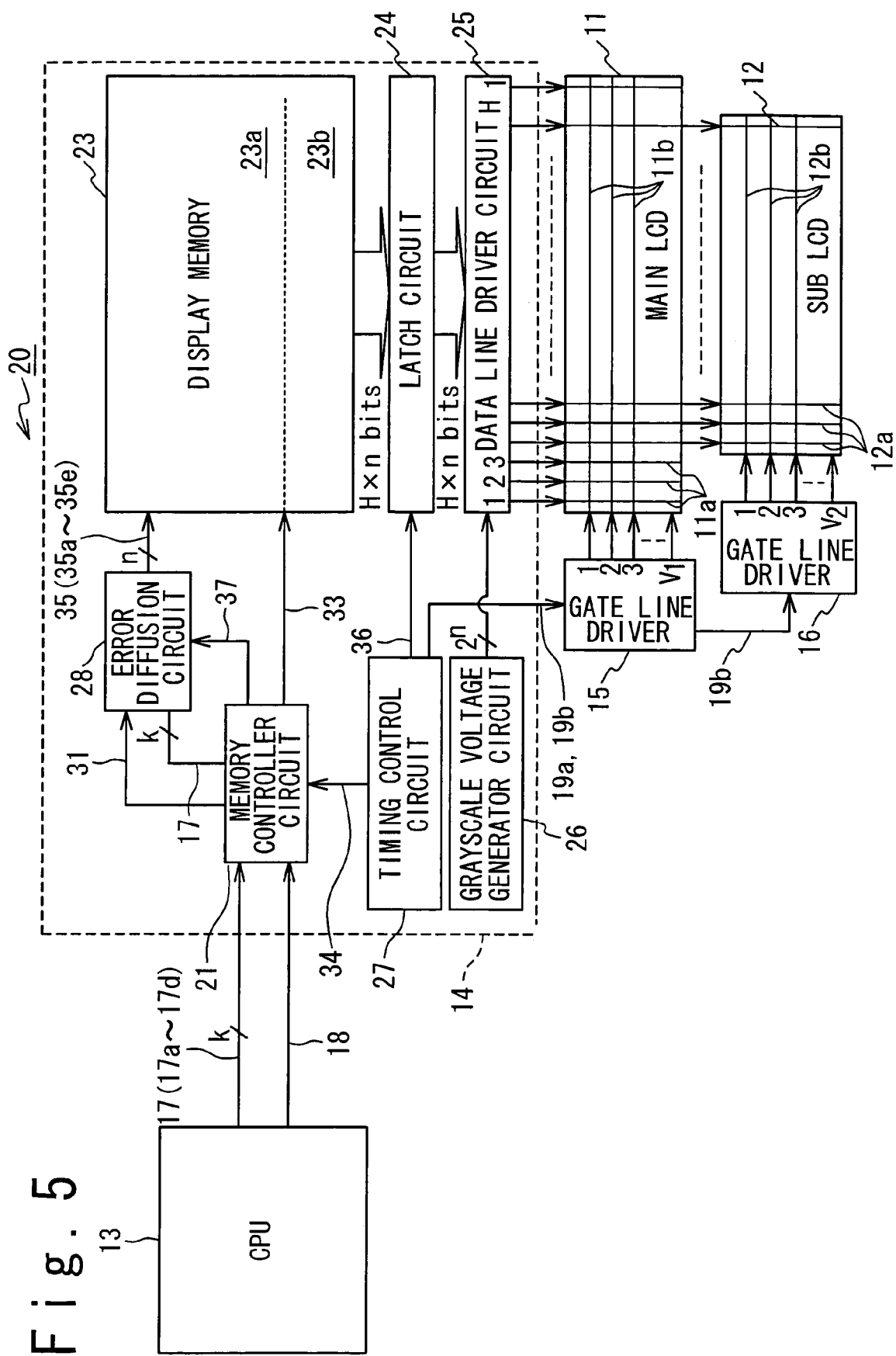
FIG. 5 is block diagram illustrating an exemplary structure of a display device including a controller/driver in accordance with a second embodiment of the present invention.

FIG. 5 is a block diagram illustrating the structure of a display device 20 in accordance with a second embodiment of the present invention. The display device 20 offers the r-bit color reduction for the input image data 17 through error diffusion in place of dithering. In order to achieve error diffusion, the dither circuit 22 is replaced with an error diffusion circuit 28 in this embodiment. Additionally, the memory controller 21 is designed to provide an initial error switch signal 37 for the error diffusion circuit 28 in place of the matrix switch signal 28. The initial error switch signal 37 is indicative of the initial error to be used by the error diffusion circuit 28. Furthermore, the memory controller 21 is designed to provide the error diffusion circuit 28 with the coordinate data 31, representative of the x and y coordinates of each pixel.

Figure 6:
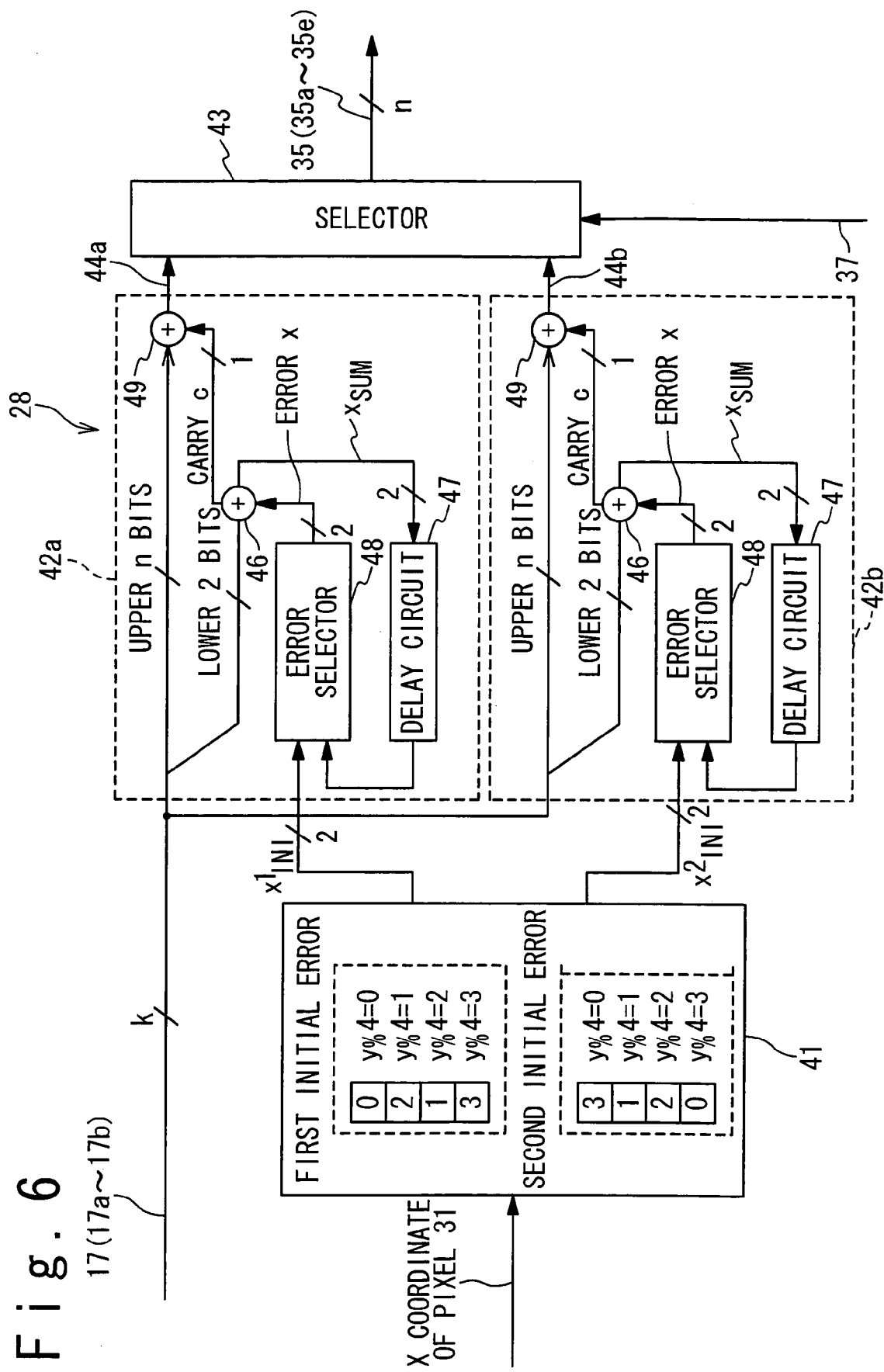
FIG. 6 is a block diagram illustrating an error diffusion circuit within the controller/driver in the second embodiment.

FIG. 6 illustrates an exemplary structure of the error diffusion circuit 28, designed to offer 2-bit color reduction through error diffusion; this implies that r is equal to two. The error diffusion circuit 28 is composed of an initial error configuration circuit 41, first and second error diffusion sections 42a and 42b, and a selector 43. The initial error configuration circuit 41 generates first and second initial errors $x^1_{INI}$ and $x^2_{INI}$, in response to the y coordinates indicated by the coordinate data 31. The first and second initial errors $x^1_{INI}$ and $x^2_{INI}$ are different from each other, and dependent on the y coordinate of the interested pixel. In one example, the first and second initial errors $x^1_{INI}$ and $x^2_{INI}$ are set to "0" and "3", respectively, when the remainder obtained by dividing the coordinate y by 4 is zero, to "2" and "1" when the remainder is one, to "1" and "2", when the remainder is two, and to "3" and "0", respectively, when the remainder is three.

The first error diffusion section 42a applies error diffusion to the input image data 17 using the first initial error $x^1_{INI}$, received from the initial error configuration circuit 41, to generate the first color-reduced image data 44a. In order to achieve error diffusion, the first error diffusion section 42a is composed of an adder 46, a delay circuit 47, an error selector 48, and another adder 49. The adder 46 adds a 2-bit error x received from the error selector 48 to the lower two bits of the input image data 47, and thereby develops a sum data $x_{SUM}$ and a carry c. The sum data $x_{SUM}$ is a 2-bit data representing the sum of the lower two bits of the input image data 47 and the error x. The delay circuit 47 delays the sum data $x_{SUM}$ by the delay time associated with one pixel processing. The error selector 48 selects the first initial error $x^1_{INI}$ as the error x to output the adder 46, when the x coordinate of the interested pixel is "1" (that is, when the interested pixel is the leftmost pixel), while selecting the output of the delay circuit 47 as the error x to output the adder 46. The adder 49 adds the carry c to the upper n bits of the input image data 17. The output of the adder 49 is the first color-reduced image data 44a, obtained by the error diffusion using the first initial error $x^1_{INI}$.

The second error diffusion section 42b applies error diffusion to the input image data 17 using the second initial error $x^2_{INI}$ received from the initial error configuration circuit 41. The structure of the second error diffusion section 42b is almost identical to that of the first error diffusion section 42a in the exception that the error selector 48 receives the second initial error $x^2_{INI}$ in place of the first initial error $x^1_{INI}$.

The selector 43 is responsive to the initial error switch signal 37 to select one of the first and second color-reduced image data 44a and 44b as the color-reduced image data 35. Specifically, the first color-reduced image data 44a is outputted as the color-reduced image data 35 when the initial error switch signal 37 is set to logical value "0". When the initial error switch signal 37 is set to logical value "1", on the other hand, the second color-reduced image data 44b is outputted as the color-reduced image data 35.

The thus-described architecture of the error diffusion circuit 28 equivalently achieves color-reduction of the input image data 17 through error diffusion using the initial error $x^1_{INI}$, when the initial error switch signal 37 is set to logical value "0", and achieves color-reduction of the input image data 17 through error diffusion using the initial error $x^2_{INI}$, when the initial error switch signal 37 is set to logical value "1".

2. Operation of Display Device

Referring to FIG. 5, the operation of the display device 20 in this embodiment is similar to that of the display device 10 in the first embodiment except for that the controller/driver 14 applies the error diffusion using the first initial error $x^1_{INI}$ in place of the dithering using the dither matrix $A^1$, and applies the error diffusion using the second initial error $x^2_{INI}$ in place of the dithering using the dither matrix $A^2$.

When the controller/driver 14 is placed into the normal mode, the memory controller circuit 21 sets the initial error switch signal 37 to logical value "0". In response to the initial error switch signal 37 being set to logical value "0", the error diffusion circuit 28 is configured to output the first color-reduced image data 44a as the resultant color-reduced image data 35. This is equivalent to that the error diffusion circuit 28 is configured to implement the error diffusion using the first initial error $x^1_{INI}$. Upon receiving the main and sub image data 17a and 17b from the CPU 13 through the memory controller circuit 21, the error diffusion circuit 28 applies the error diffusion using the first initial error $x^1_{INI}$ to the main and sub image data 17a and 17b to develop the color-reduced main image data 35a, and the color-reduced sub image data 35b. The color-reduced main image data 35a is stored in the main region 23a, and the color-reduced sub image data 35b is stored in the sub region 23b. The data line driver circuit 25 drives the data lines 11a within the main LCD panel 11 in response to the color-reduced main image data 35a, stored in the main region 23a, while driving the data lines 11b within the sub LCD panel 12 in response to the color-reduced sub image data 35b, stored in the sub region 23b. This results in that the images associated with the main and sub image data 17a and 17b are displayed on the main and sub LCD panel 11 and 12, respectively.

When the controller/driver 14 is placed into the image quality enhance mode, on the other hand, the CPU 13 develops the normal quality image data 17c, and the enhanced quality image data 17d, the normal quality image data 17c being associated with the image to be displayed on the normal image quality region, and the enhanced quality image data 17d being associated with the image to be displayed on the enhanced image quality region. The normal quality image data 17c, and the enhanced quality image data 17d are provided for the error diffusion circuit 28 through the memory controller circuit 21.

When the normal quality image data 17c is provided for the error diffusion circuit 28, the memory controller circuit 21 sets the initial error switch signal 37 to logical value "0". This configures the error diffusion circuit 28 to implement the error diffusion using the first initial error $x^1_{INI}$. The error diffusion circuit 28 applies the error diffusion using the first initial error $x^1_{INI}$ to the normal quality image data 17c to develop the color-reduced normal-quality image data 35c. The color-reduced normal-quality image data 35c is stored in the main region 23a of the display memory 23.

When the enhanced quality image data 17d is provided for the error diffusion circuit 28, on the other hand, on the other hand, the memory controller circuit 21 switches the initial error switch signal 37 at the frequency twice as high as the frequency at which data bits of the enhanced quality image data 17d are inputted to the error diffusion circuit 28. More specifically, the memory controller circuit 21 provides pixel data of a specific pixel of the enhanced quality image data 17d with the initial error switch signal 37 set to logical value "0". In response to the initial error switch signal 37 being set to logical value "0", the error diffusion circuit 28 selects the first error diffusion section 42a, which implements error diffusion using the initial error $x^1_{INI}$, to apply error diffusion to the specific pixel data. The resultant pixel data is stored in the main region 23a of the display memory 23. The memory controller circuit 21 then switches the initial error switch signal 37 to logical value "1". In response to the initial error switch signal 37 being set to logical value "1", the error diffusion circuit 28 selects the second error diffusion section 42b, which implements error diffusion using the initial error $x^2_{INI}$, to apply error diffusion to the specific pixel data. The resultant pixel data is stored in the sub region 23b of the display memory 23. The same goes for the other pixels. This procedure allows the error diffusion circuit 28 to develop the first color-reduced enhanced-quality image data 35d through error diffusion with the first initial error $x^1_{INI}$, and to develop the second color-reduced enhanced-quality image data 35e through error diffusion with the second initial error $x^2_{INI}$.

The color-reduced normal-quality image data 35c and the first color-reduced enhanced-quality image data 35d are stored in the main region 23a, and the second color-reduced enhanced-quality image data 35e is stored in the sub region 23b. The data line driver circuit 25 uses the color-reduced normal-quality image data 35c and the first and second color-reduced enhanced-quality image data 35d and 35e. The pixels within the normal image quality region of the main LCD panel 11 are driven in response to the color-reduced normal-quality image data 35c, while the pixels within the enhanced image quality region are driven in response to the first and second color-reduced enhanced-quality image data 35d and 35e.

As is the case of the first embodiment, images are displayed with the normal image quality on the normal image quality region of the main LCD panel 11, while the image quality is enhanced within the enhanced image quality region through the use of error diffusion and frame rate control. The color-reduced normal image data 35c are retrieved from the display memory 23 at every frame, and the pixels are driven in response to the retrieved color-reduced normal image data 35c within the normal image quality region. This achieves displaying the image associated with the normal quality image data 17c with the normal image quality on the normal image quality region of the main LCD panel 11. On the other hand, the first and second color-reduced enhanced-quality image data 34d and 35e are alternately retrieved. At odd frames, the first color-reduced enhanced-quality image data 34d is retrieved from the display memory 23, and the pixels within the enhanced image quality region are driven in response to the first color-reduced enhanced-quality image data 34d. At even frames, on the other hand, the second color-reduced enhanced-quality image data 34e is retrieved from the display memory 23, and the pixels within the enhanced image quality region are driven in response to the first color-reduced enhanced-quality image data 34e. Alternately using the image data generated through error diffusion with different initial errors effectively reduces moiré potentially caused by error diffusion, and thereby achieves improvement of the image quality within the enhanced image quality region.

In summary, the controller/driver 14 in this embodiment, which makes use of the memory resource provided for driving multiple LCD panels, achieves improvement of the image quality using the error diffusion and the frame rate control with the reduced memory capacity. Additionally, the controller/driver 14 in this embodiment effectively achieves the improvement of the image quality through the error diffusion and frame rate control with reduced power consumption.

The first and second initial errors $x^1_{INI}$ and $x^2_{INI}$, which are used for generating the first and second color-reduced enhanced-quality image data 35d and 35e, are determined so that the following equation is satisfied for the arbitrary pixel lines (that is, the arbitrary y coordinate of the pixels):

$$x^1_{INI} + x^2_{INI} = \text{const.}$$

Displaying the images generated using the initial errors $x^1_{INI}$ and $x^2_{INI}$ thus configured allows the diffusion errors to be uniformly distributed in terms of both the time and special domains. This effectively improves the image quality.

Third Embodiment

1. Display Device Structure

Figure 7:
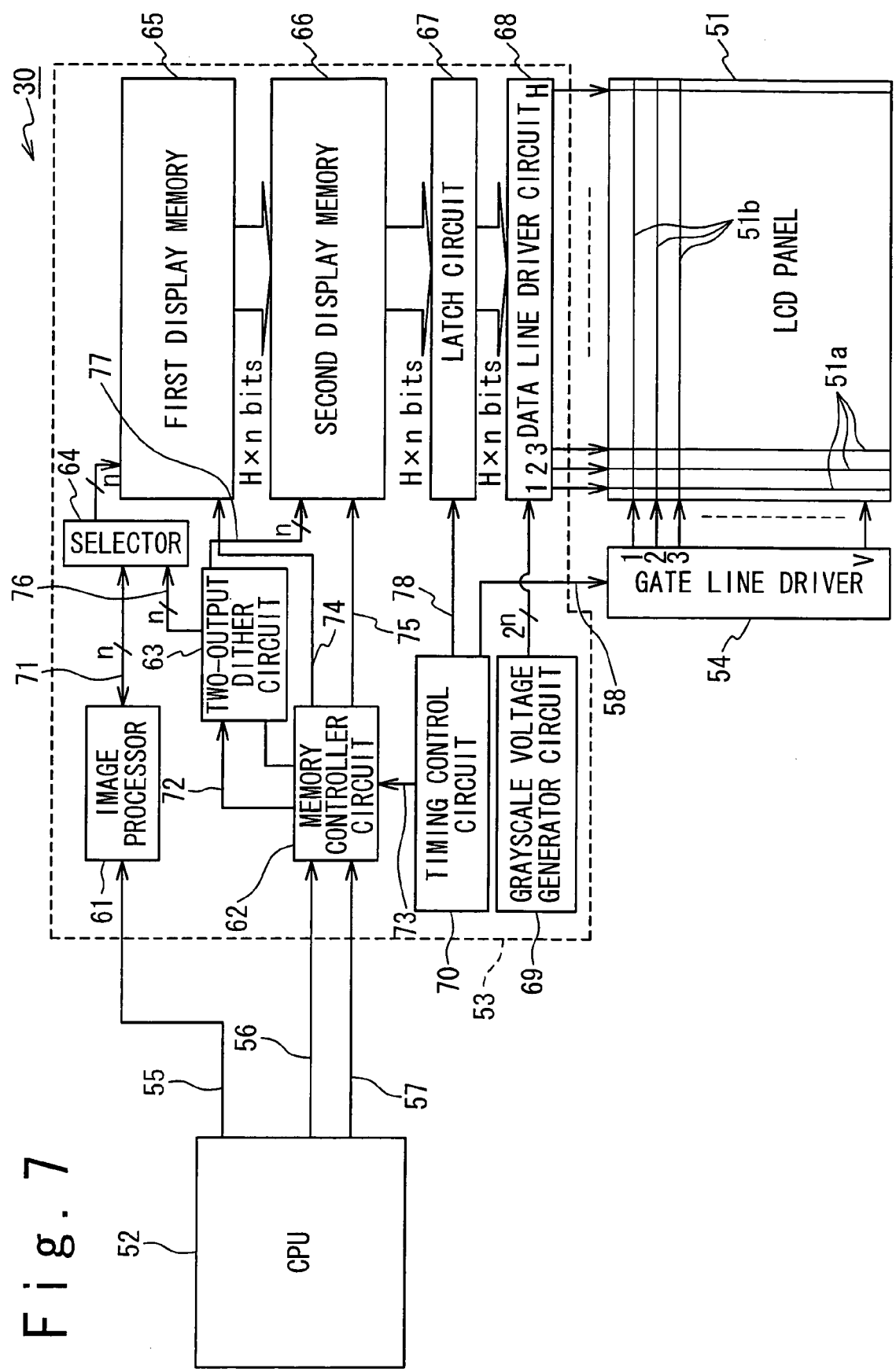
FIG. 7 is a block diagram illustrating an exemplary structure of a display device in accordance with a third embodiment of the present invention.

FIG. 7 illustrates an exemplary structure of a display device 30 in accordance with a third embodiment of the present invention. In the third embodiment, image data is partially transmitted to a controller/driver in a vector form, and the remainder is transmitted in the bitmap form. Such method is effective for reducing the amount of image data transmitted to the controller/driver with the necessary image quality achieved. From the inventors' recognitions, the bitmap form is suitable for representing some images displayed on portable devices, and vector forms are suitable for representing other images.

Photograph images, which require many graylevels for achieving rich representations, such as fine gradation, are suitable for being represented in the bitmap form. Images mainly represented by contrast, such as video game images and map images, are not suitable for the bitmap form, because the use of the bitmap form unnecessarily increases the data size. Additionally, representing moving pictures by image data in the bitmap form undesirably necessitates increased data transfer. Therefore, in this embodiment, a vector form is used for transferring images which require reduced data transfer, such as video game images and map images.

In the first embodiment, as illustrated in FIG. 7, a display device 30 is composed of an LCD 51, a CPU 52, a controller/driver 53, and a gate line driver 54.

The LCD panel 51 includes H data lines (source lines) 51a, and V gate lines 51b, which intersect each other. The data lines 51a extend in the y-axis direction (vertical direction), while the gate lines 51b extend in the x-axis direction (horizontal direction). Pixels are disposed at the intersections of the data lines 51a and the gate lines 51b; in other words, the LCD 1 includes pixels arranged in H lines and V columns.

CPU 52 develops image data representative of images to be displayed on the LCD panel 51, and provides the developed image data for the controller/driver 53. The image data transferred from the CPU 52 to the controller/driver 53 are developed in one of the two forms: one is the bitmap form, and another is a vector form.

In the case when the developed image is suitable for the vector data, the CPU 52 generates vector data 55 representing the image to output the controller/driver 53. The vector data 55 is composed of vector graphic commands (which may be simply referred to as command hereinafter), each representative of a graphic primitive included in the image; an image frame is represented by one or more commands. The vector data 5 may be described in the SVG™ (Scalable Vector Graphic) form, or the MacromediaFlash™ form. The use of the vector form allows an image to be represented with reduced data compared to the bitmap form, and thereby effectively reduces data transfer from the CPU 52 to the controller/driver 53.

In the case when the image developed by the CPU 52 is suitable for being represented in the bitmap form, for example, when the developed image is a photograph image represented by many graylevels, the CPU 52 develops bitmap data 56 associated with the image to output to the controller/drivers. The bitmap data 56 is k-bit bitmap data, which is adapted to $2^k$ graylevel images, while the aforementioned vector data 55 is image data adapted to $2^n$ graylevel images; it should be noted that n is smaller than k. Additionally, the CPU 52 controls the controller/driver 53 through providing memory control signals 57.

The controller/driver 53 drives the data lines 51a of the LCD 51 in response to the vector data 55, the bitmap data 56, and the memory control signals 57, which are received from the CPU 52. The controller/driver 53 is configured to be adapted to both of the vector data 55, and the bitmap data 56. When the vector data 55 is transferred to the controller/driver 53, the controller/driver 53 is placed into a vector data mode. When the bitmap data 56 is transferred to the controller/driver 53, on the other hand, the controller/driver 53 is placed into a bitmap data mode. When being placed into the vector data mode, the controller/driver 53 converts the vector data 55 into bitmap data, and drives the LCD panel 51 using the bitmap data developed from the vector data 55. When being placed into the bitmap data mode, on the other hand, the controller/driver 53 drives the LCD panel 51 in response to the bitmap data 56. Additionally, the controller/driver 53 generates a control signal 58 for controlling the operation timing of the gate line driver 54. As described later, the controller/driver 53 is designed to display quality-enhanced image on the LCD panel 51 by using dithering and frame rate control when receiving the bitmap data 56.

The gate line driver 54 drives the gate lines 51b of the LCD panel 51 in response to the control signal 58 received from the controller/driver 53.

2. Structure of Controller/Driver

The controller/driver 53 is composed of an image processor 61, a memory controller circuit 62, a two-output dither circuit 63, a selector 64, a first display memory 65, a second display memory 66, a latch circuit 67, a data driver circuit 68, a grayscale voltage generator circuit 69, and a timing controller 70.

The image processor 61 converts the vector data 65 into bitmap data, and develops the bitmap data onto the first display memory 65. The image processor 61 uses the first display memory 65 as the work area for developing the bitmap data. In details, the image processor 61 sequentially interprets the commands within the vector data 55 to develop intermediate work data 71 representative of the graphic primitives associated with the commands, and sequentially writes the developed intermediate work data 71 into the first display memory 65. It should be noted that the intermediate work data 71 is described in the bitmap form. When a graphic primitive associated with newly developed one of the intermediate work data 71 overlaps another graphic primitive already existing in the first display memory 65, the image processor 61 overwrites the associated portion of the first display memory 65. After completing interpretation of the commands associated with an image frame, the bitmap data representing the image frame is developed onto the first display memory 65.

The memory controller circuit 62 is designed to transfer the bitmap data 66 received from the CPU 62 to the two-output dither circuit 63, and to provide the two-output dither circuit 63 with the coordinate data 72 representative of x and y coordinates of each pixel. Additionally, the memory controller circuit 62 generates first and second memory control signals 74 and 75 to control the first and second display memories 65 and 66 in response to the control signal 57 received from the CPU 13 and a timing control signal 73 received from the timing controller circuit 70. The first and second memory control signals 74 and 75 each include an address signal representative of the accessed address, a row address strobe signal (RAS), a column address strobe signal (CAS). The access timings and operation timings of the first and second display memories 65 and 66 are controlled by these control signals.

The two-output dither circuit 63 offers r-bit color-reduction through dithering using the coordinate data 72 for the bitmap data 56, and thereby develops first and second color-reduced image data 76 and 77, where r is an integer smaller than k. The first and second color-reduced image data 76 and 77 are each n-bit bitmap data, representing a graylevel of each pixel by n bits, n being k minus r. In other words, the first and second color-reduced image data 76 and 77 are $2^n$ graylevel bitmap data. In detail, the two-output dither circuit 63 generates the first color-reduced image data 76 through dithering using a dither matrix $A^1$, and also generates the second color-reduced image data 77 through dithering using another dither matrix $A^2$. The dither matrixes $A^1$ and $A_2$ are (r, r) bayer matrixes different from each other.

The selector 64 selects one of the intermediate work data 71 received from the image processor 61 and the first color-reduced image data 76, and outputs the selected data to the first display memory 65. When the controller/driver 53 is placed into the vector data mode, the selector 64 selects the intermediate work data 71 to output the first display memory 65. When the controller/driver 53 is placed into the bitmap data mode, on the other hand, the selector 64 selects the first color-reduced image data 76 to output the first display memory 65.

The first display memory 65 stores therein the image data received from the selector 64, that is, the selected one of the intermediate work data 71, and the first color-reduced image data 76. The first display memory 65 has a capacity of H×V×k/2 bits. This implies that the first display memory 65 has a capacity sufficient to store the image data necessary for $2^n$ grayscale display of one image frame. The first display memory 65 outputs the data stored therein to the second display memory 66 in response to the first memory control signal 74 received from the memory control circuit 62. The first display memory 64 is designed to output H×n data bits in parallel.

The second display memory 66 is responsive to the second memory control signal 75 received from the memory control circuit 62 for storing the image data received from the first display memory 65, or storing the second color-reduced image data 77 received from the two-output dither circuit 63. As is the case of the first display memory 65, the second display memory 66 has a capacity of H×V×n bits. The second display memory 66 outputs the data stored therein to the latch circuit 67 in response to the second memory control signal 75 received from the memory controller circuit 62. The second display memory 66 is designed to output H×n data bits in parallel. Additionally, as described later in detail, the second display memory 66 is design to transfer the data stored in the first display memory 65 to the latch circuit 17 without damaging the data stored in the second display memory 66. This eliminates a need for providing dedicated interconnections for transferring the data from the first display memory 65 to the latch circuit 67, and effectively reduces the chip size of the controller/driver 53.

The latch circuit 67, the data line driver circuit 68, and the grayscale voltage generator circuit 69 function as a drive circuitry for driving the LCD panel 51 in response to the data stored in the first and second display memories 65 and 66. The functions of the latch circuit 67, the data line driver circuit 68, and the grayscale voltage generator circuit 69 are identical to the latch circuit 24, the data line driver circuit 25, and the grayscale voltage generator circuit 26 within the controller/driver 14 in the first embodiment. The latch circuit 67 latches the pixel data of H×n bits associated with the selected line from the second display memory 66, in response to a latch signal 78 received from the timing control circuit 70, and transfers the latched pixel data to the data line driver circuit 68. It should be noted that the pixel data received from the second display memory 66 may be the pixel data transferred from the first display memory 65 through the second display memory 66. The grayscale voltage generator circuit 69 provides the data line driver circuit 68 with $2^n$ voltages respectively associated with the $2^n$ graylevels representable on the LCD panel 51. The data line driver circuit 68 selects one of the $2^n$ voltages for each pixel in response to the associated pixel data, and develops the selected voltage onto the associated data line 51*a* within the LCD panel 51.

The timing control circuit 70 provides timing control for the memory controller circuit 62, the first display memory 65, the second display memory 66, the latch circuit 67 within the controller/driver 53, and for the gate line driver 54. More specifically, the timing control circuit 70 provides a timing control signal 73 for the memory controller circuit 62, and thereby controls write and read timings of the first and second display memories 65 and 66. Additionally, the timing controller 70 generates the latch signal 78 to output the latch circuit 67, and thereby controls data latch timing for the latch circuit 67. Finally, the timing control circuit 70 provides a timing control signal 58 for the gate line driver 54, and thereby controls the activation timing of the gate lines 51*b* within the LCD panel 51. The frame rate at which images are displayed on the LCD panel 51 is controllable by the timing control signal 73, the latch signal 78, and the timing control signal 58.

3. Structure of Two-Output Dither circuit

Figure 8:
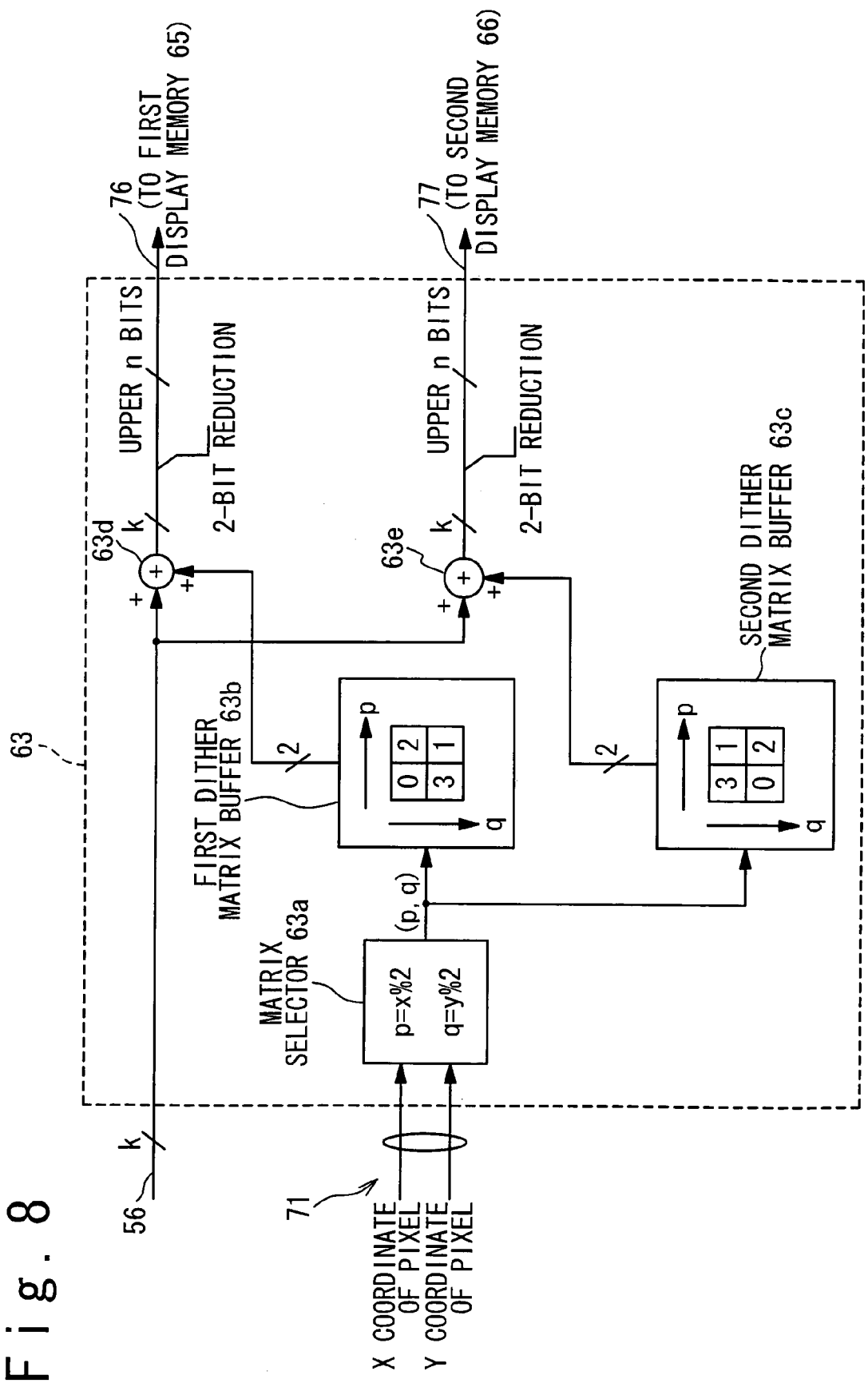
FIG. 8 is a block diagram illustrating an exemplary structure of a two-output dither circuit within the controller/driver in the third embodiment.

FIG. 8 is a block diagram illustrating an exemplary structure of the two-output dither circuit 63 configured to achieve 2-bit color-reduction, assuming that r (=k−n) is two. The two-output dither circuit 63 is composed of a matrix selector 63*a*, first and second dither matrix buffers 63*b* and 63*c*, adders 63*d* and 63*e*. The two-output dither circuit 63 receives k-bit pixel data for each pixel, the data bits of the k-bit pixel data being inputted to the two-output dither circuit 63 in parallel. Additionally, the two-output dither circuit 63 receives the coordinate data 72 representative of x and y coordinates of each pixel.

The matrix selector 63*a* calculates a remainder p obtained by dividing the x coordinate of the pixel by two, and a remainder q obtained by dividing the y coordinate of the pixel by two. The remainders p and q are each the value selected out of "0" and "1".

The first and second dither matrix buffers 63*b* and 63*c* store therein the dither matrixes $A^1$ and $A^2$, respectively. The (i, j) element of the dither matrix $A^1$ is referred to as $a^1_{ij}$, and the (i, j) element of the dither matrix $A^2$ is referred to as $a^2_{ij}$. The elements $a^1_{ij}$ and $a^2_{ij}$ are each two-bit data.

Upon receiving the remainders p, and q, the first dither matrix buffer 63*b* outputs the (p, q) element $a^1_{pq}$ of the dither matrix $A^1$. Correspondingly, the second dither matrix buffer 63*c* outputs the (p, q) element $a^2_{pq}$ of the dither matrix $A^2$ upon receiving the remainders p, and q.

The adder 63*d* adds the output $a^1_{pq}$ of the dither matrix buffer 63*b* to the bitmap data 56. The upper n bits of the output of the adder 63*d* are retrieved as the first color-reduced image data 76, and the first color-reduced image data 76 is stored in the first display memory 65.

Correspondingly, the adder 63*e* adds the output $a^1_{pq}$ of the dither matrix buffer 63*b* to the bitmap data 56. The upper n bits of the output of the adder 63*e* are retrieved as the second color-reduced image data 77, and the second color-reduced image data 77 is stored in the second display memory 66.

The two-output dither circuit 63 thus constructed is adapted to develop the first color-reduced image data 76 through applying dithering to the bitmap data 56 with the first dither matrix $A^1$, and to develop the second color-reduced image data 77 through applying dithering to the bitmap data 56 with the second dither matrix $A^2$.

4. Structure of First and Second Display Memory

Figure 9:
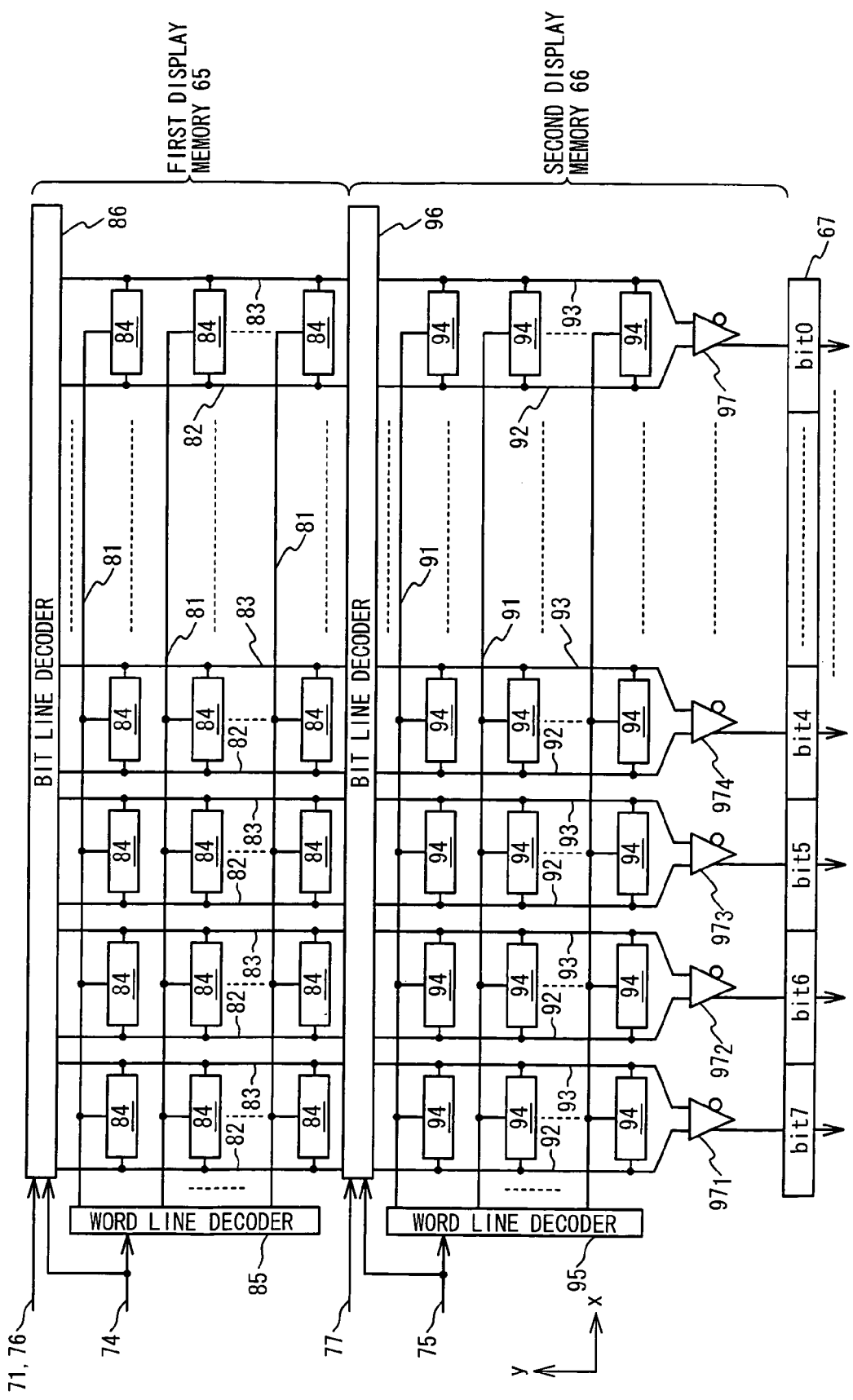
FIG. 9 is a block diagram illustrating exemplary structures of first and second display memories within the controller/driver in the third embodiment.

FIG. 9 illustrates detailed circuit structures of the first and second display memories 65, and 66.

The first display memory 65 is composed of word lines 81, bit lines 82, complementary bit lines 83, memory cells 84, a word line decoder 85, and a bit line decoder 86. The number of the word lines 81 is V, which is identical to the number of the gate lines 51*b*. The number of the bit lines 82 and the complementary bit lines 83 is H×n, H being the number of the data lines 51*a*. Finally, the number of the memory cells 84 is H×n. The word lines 81 are disposed to extend in the x-axis direction, and the bit lines 82 are disposed to extend in the y-axis direction. The complementary bit lines 83 are respectively associated with the bit lines 82; the voltage of each complementary bit line 83 is complementary to the associated bit line 82. One bit line 82 and the associated bit line 83 are collectively referred to as a bit line pair. The memory cells 84 are arranged at the respective intersections of the word lines 81 and the bit lines 82. Each memory cell 84 is connected to the associated word line 81, bit line 82, and complementary bit line 83. The word line decoder 85 is used for selecting the word lines 81 in response to the first memory control signal 74. The bit line decoder 86 is used for data access through the bit lines 82 and the complementary bit lines 83; the bit line decoder 86 develops voltages corresponding to the data received from the selector 64 on the associated bit lines 82 and complementary bit lines 83. The data received from the selector 64 may be the intermediate work data 71 or the first color-reduced image data 76.

The data transfer from the first display memory 65 to the second display memory 66 is achieved through directly connecting the bit lines 82 and the complementary bit lines 83 with the second display memory 66. In an alternative embodiment, the bit lines 82 and the complementary bit lines 83 may be connected with sense amplifiers, and the sense amplifiers may be used for data transfer from the first display memory 65 to the second display memory 66.

The structure of the second display memory 166 is almost identical to that of the first display memory 65 with exception that the second display memory 66 additionally includes sense amplifiers. More specifically, the second display memory 66 is composed of word lines 91, bit lines 92, complementary bit lines 93, memory cells 94, a word line decoder 95, a bit line decoder 96, and sense amplifiers 97. The number of the word lines 91 is V, and the number of the bit lines 93 and the complementary bit lines 34 is H×n. Additionally, the number of the memory cells 94 is H×V×n, and the number of the sense amplifiers 97 is H×n. The word lines 91 are disposed to extend in the x-axis direction, and the bit lines 92 are disposed to extend in the y-axis direction. The complementary bit lines 93 are respectively associated with the bit lines 92; the voltage of each complementary bit line 93 is complementary to the associated bit line 92. One bit line 92 and the associated bit line 93 are collectively referred to as a bit line pair. The memory cells 94 are arranged at the respective intersections of the word lines 91 and the bit lines 92. Each memory cell 94 is connected to the associated word line 91, bit line 92, and complementary bit line 93. The word line decoder 95 is used for selecting the word lines 91 in response to the second memory control signal 75. The bit line decoder 96 is used for data access through the bit lines 92 and the complementary bit lines 93; the bit line decoder 96 electrically connects the bit lines 82 and complementary bit lines 83 of the first display memory 65 with the associated bit lines 92 and complementary bit lines 93 of the second display memory 66. Additionally, the bit line decoder 96 receives the second color-reduced image data 77 in response to the second memory control signal 75, and develops voltages corresponding to the second color-reduced image data 77 on the associated bit lines 92 and complementary bit lines 93. The sense amplifiers 97 are respectively associated with the bit line pairs. The sense amplifiers 97 compares the voltages developed on the associated bit lines 92 and complementary bit lines 93 to identify the data developed on the associated bit lines 92. The sense amplifiers 97 are one-to-one associated with the bit line pairs.

The memory architecture in which the number of the bit lines within the first display memory 65 is identical to that of the second display memory 66 is effective for facilitating the data transfer from the first display memory 65 to the second display memory 66. Such memory architecture allows one-to-one connection between the bit lines 82 within the first display memory 65, and the bit lines 92 within the second display memory 66. The same goes for the complementary bit lines 83 and 93. This effectively simplifies the circuits used for transferring the image data. Additionally, the aforementioned memory architecture allows the memory controller circuit 62 to use the same address to identify the location of the data source and destination of the image data. This effectively simplifies address generation.

Additionally, the structures of the first and second display memories 65 and 66 allows the data transfer of the pixel data of the selected line from the first display memory 65 to the latch circuit 67 through the second display memory 66 without damaging the data stored in the second display memory 66. The pixel data of the selected line from the first display memory 65 to the latch circuit 67 can be achieved by activating the selected word line of the first display memory 65 with all of the word lines 91 of the second display memory 66 deactivated, electrically connecting the bit lines 82 within the first display memory 65 with the bit lines 92 within the second display memory 66 through the bit line decoder 96, and activating the sense amplifiers 97 within the second display memory 66. Deactivating all of the word lines 91 within the second display memory 66 effectively prevents the data stored in the second display memory 66 from being destroyed.

5. Operation of Display Device

As described above, the controller/driver 53 has two operation modes: the vector data mode, and the bitmap data mode. The detailed operation of the controller/driver 53 will be given for the vector data mode, and the bitmap data mode, respectively.

5-1) Vector Data Mode Operation

Figure 10:
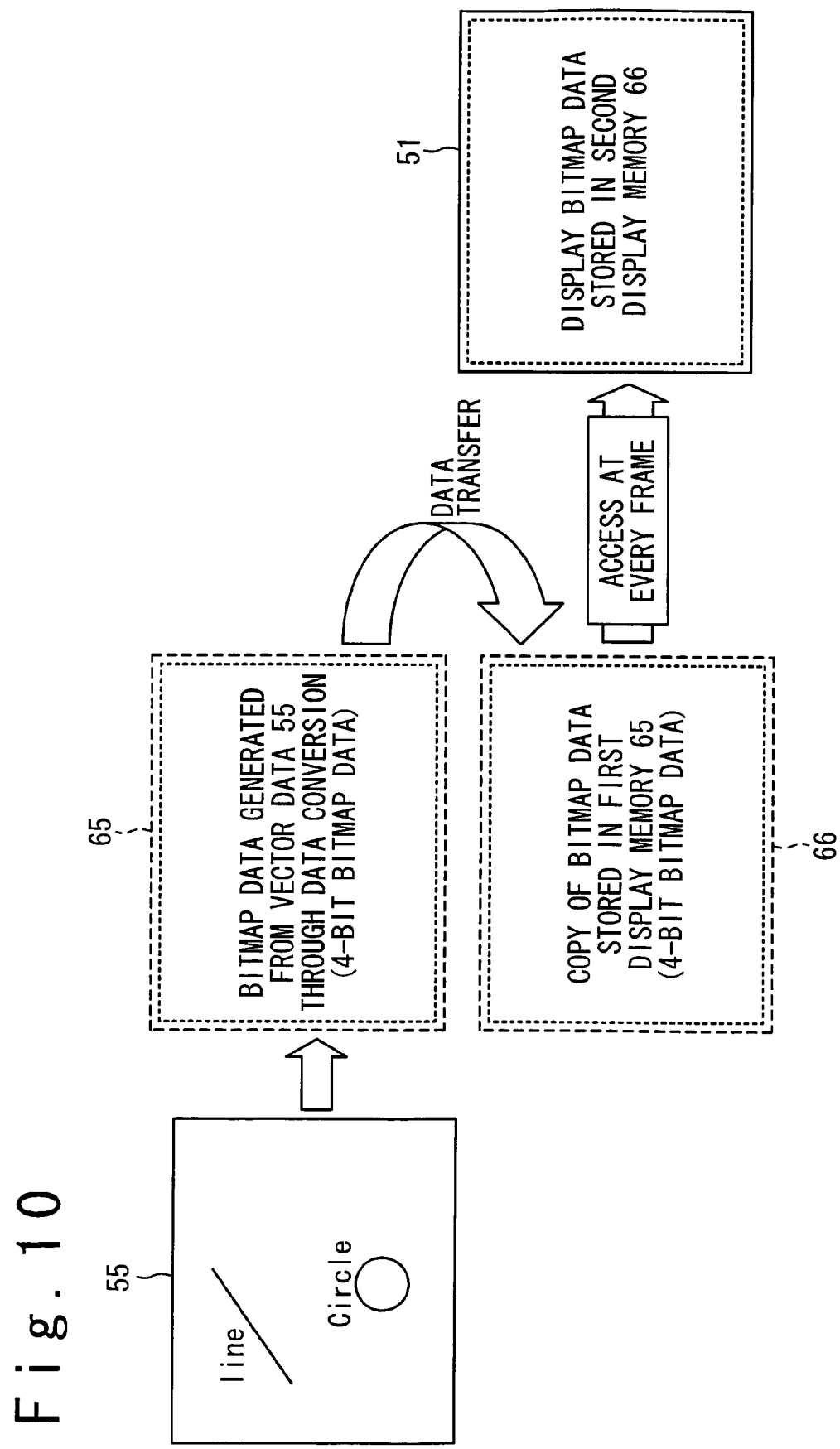
FIG. 10 is a schematic illustrating an exemplary operation in the third embodiment, when the controller/driver is placed into a vector data mode.

FIG. 10 illustrates an exemplary operation of the display device 30 in this embodiment when the controller/driver 53 is placed into the vector data mode. The CPU 52 informs the controller/driver 53 by the control signal 57 that the vector data 55 is provided for the controller/driver 53, and thereby allows the controller/driver 53 to be placed into the vector data mode. Additionally, the CPU 52 generates the vector data 55 corresponding to the image to be displayed on the LCD panel 51 to output the controller/driver 53.

When receiving the vector data 55 from the CPU 52, the controller/driver 53 drives the LCD panel 51 in response to the vector data 55. The vector data 55 is firstly converted into bitmap data by the image processor circuit 61, and the LCD panel 51 is driven in response to the bitmap data obtained from the vector data 55. The LCD drive in response to the vector data 55 involves the following steps.

Data-conversion of the vector data 55 is firstly implemented to develop the corresponding bitmap data onto the first display memory 65. Upon receiving the vector data 55 from the CPU 52, the image processor 61 sequentially interprets the commands described in the vector data 55 to identify the graphic primitives to be incorporated in the display image, and develops the intermediate work data 71 corresponding to the graphic primitives in the bitmap form. The developed intermediate work data 71 is stored into the first display memory 65. When a graphic primitive associated with newly developed one of the intermediate work data 71 overlaps another graphic primitive already existing in the first display memory 65, the image processor 61 overwrites the associated portion of the first display memory 65. After completing interpretation of the commands associated with an image frame, bitmap data representing the image frame is developed onto the first display memory 65. The bitmap data developed onto the first display memory 65 is n-bit bitmap data, representative of $2^n$ graylevels.

The bitmap data developed onto the first display memory 65 is then transferred to the second display memory 66. The LCD panel 51 is driven in response to the bitmap data stored in the second display memory 66. After the data transfer, the data conversion of the vector data 5 is implemented for the next frame image, while driving the LCD panel 61 in response to the bitmap data stored in the second display memory and 65. This effectively improves display latency after the vector data 55 is inputted to the controller/driver 53.

The bitmap data developed onto the first display memory 65 is not directly used for driving the LCD panel 51. This addresses avoiding an "incomplete" image being displayed on the LCD panel 51. It is not until the complete set of the commands associated with the target image frame are processed by the image processor 61 that an "complete" bitmap data is developed onto the first display memory 65; however, the development of the "complete" bitmap data onto the first display memory 64 may fail to be synchronized with the update or refreshing timings of the images displayed on the LCD panel 51. Therefore, directly using the bitmap data stored in the first display memory 65, which is used as the work area, may cause an undesirable image to be displayed on the LCD panel 51. In order to avoid an undesirable image to be displayed, after developing a "complete" bitmap data, the "complete" bitmap data is transferred from the first display memory 65 to the second display memory 66. The bitmap data stored in the second display memory 66 is then exclusively used for updating or refreshing the images on the LCD panel 51.

This is followed by sequentially transferring the complete bitmap data stored in the second display memory 66 to the data line driver circuit 18 through the latch circuit 17, and driving the LCD panel 51 in response to the transferred bitmap data. More specifically, the data lines 51*a* within the LCD panel 51 is driven in response to the pixel data latched by the latch circuit 67, which is associated with the selected line, and the gate line 51*b* associated with the selected line is activated by the gate line driver 54. The same goes for the remaining lines to drive the data lines 51*a* and the gate liens 51*b* and thereby completes displaying the associated image frame.

5-2. Bitmap Data Mode Operation

Figure 11:
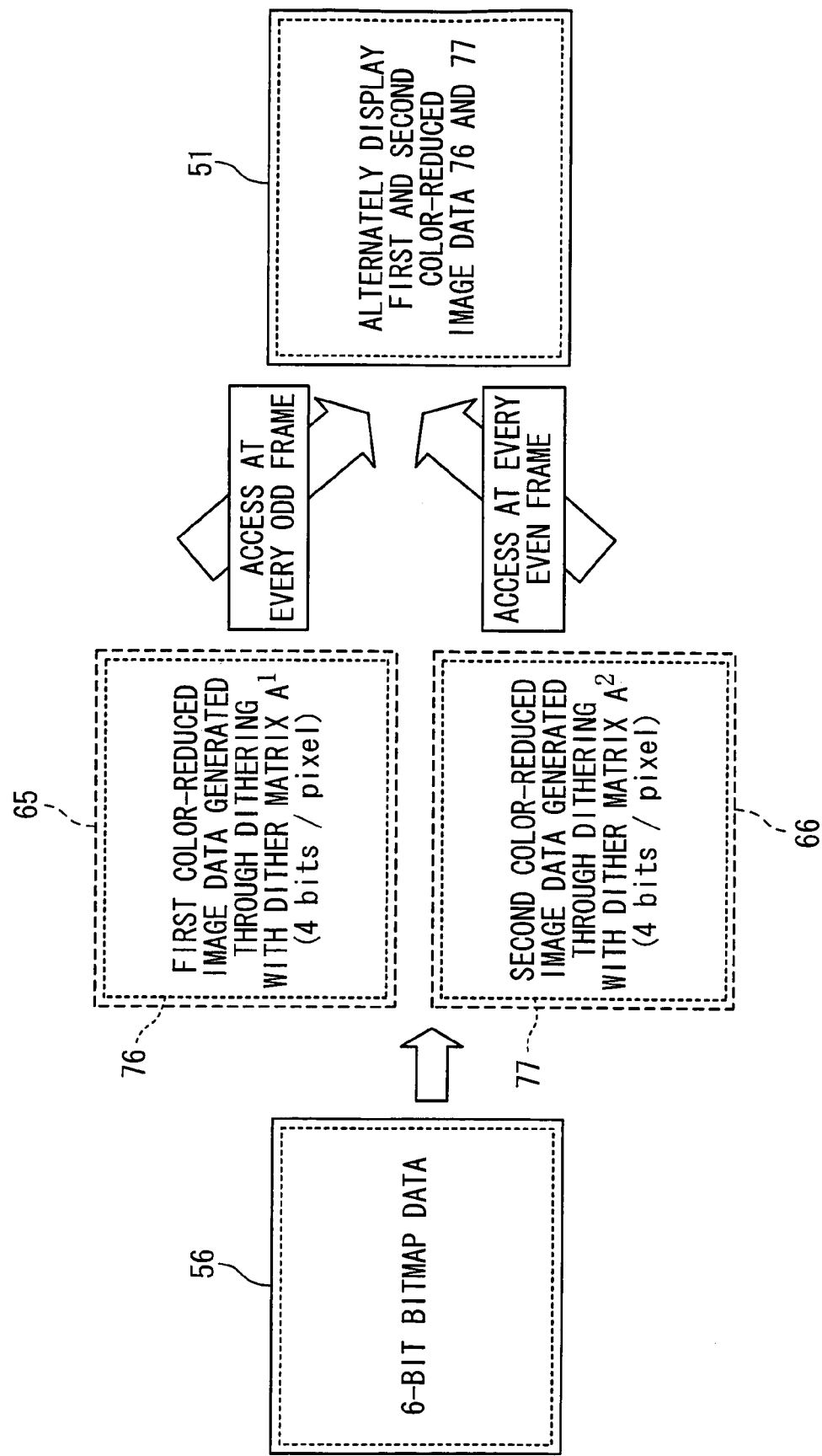
FIG. 11 is a schematic illustrating an exemplary operation in the third embodiment, when the controller/driver is place into a bitmap data mode.

FIG. 11 illustrates an exemplary operation of the display device 30 in this embodiment, when the controller/driver 53 is placed into the bitmap data mode. The CPU 52 informs the controller/driver 53 by the control signal 57 that the bitmap data 55 is provided for the controller/driver 53, and thereby allows the controller/driver 53 to be placed into the bitmap data mode. Additionally, the CPU 52 generates the bitmap data 55 corresponding to the image to be displayed on the LCD panel 51 to output the controller/driver 53.

Upon receiving the bitmap data 56 from the CPU 53, the memory controller circuit 62 within the controller/driver 53 transfers the bitmap data 56 to the two-output dither circuit 63, and additionally provides the coordinate data 72 for the two-output dither circuit 63.

The two-output dither circuit 63 applies dithering using the dither matrix $A^1$ to the bitmap data 56 to develop the first color-reduced image data 76, and also applies dithering using the dither matrix $A^2$ to the bitmap data 56 to develop the second color-reduced image data 77. The first color-reduced image data 76 is transferred to the first display memory 65 through the selector 64, and stored into the first display memory 65. The second color-reduced image data is transferred and stored into the second display memory 66.

The data line driver circuit 68 drives the data lines 51a within the LCD panel 51 in response to the first and second color-reduced image data 76 and 77 to display the corresponding image on the LCD panel 51. The quality of the image displayed on the LCD panel 51 is enhanced through dithering and frame rate control. At a first frame, the first color-reduced image data 76, which is generated through dithering using the dither matrix $A^1$, is retrieved from the first display memory 65, and the pixels within the LCD panel 51 are driven in response to the first color-reduced image data 76. The first color-reduced image data 76 is transferred from the first display memory 65 to the data line driver 68 through the bit lines 92 within the second display memory 66 and the latch circuit 67. At a second frame following the first frame, the second color-reduced image data 77, which is generated through dithering using the dither matrix $A^2$, is retrieved from the second display memory 66, and the pixels within the LCD panel 51 are driven in response to the second color-reduced image data 77. The same goes for the following frames; at odd frames, the pixels within the LCD panel 51 are driven in response to the first color-reduced image data 76, while being driven in response to the second color-reduced image data 77 at even frames. Alternately using the first and second color-reduced image data 76 and 77, which are generated with the different dither matrixes, effectively reduces the granular noise of images caused by the dithering, and thereby improves the image quality of the LCD panel 51.

The controller/driver 53 may be configured to partially update the image displayed on the LCD panel 51 as described in the following. Updating the image begins with providing the controller/driver 53 from the CPU 52 with differential image data associated with the portion of the image to be updated, and coordinate data representative of the coordinates of the pixels within the portion to be updated. The two-output dither circuit 63 applies dithering to the differential image data using the dither matrixes $A^1$ and $A^2$, and thereby develops a pair of dithered differential image data. The portion of the first display memory 65 associated with the portion to be updated is then overwritten to the dithered differential image data generated by using the dither matrix $A^1$, while the portion of the second display memory 66 associated with the portion to be updated is overwritten to the dithered differential image data generated by using the dither matrix $A^2$ This procedure completes the partial update of the image displayed on the LCD panel 51. The architecture for partially updating the image on the LCD panel 51 through transmitting only the image data to be updated effectively reduces the power consumption; this enhances the use of the display device 30 in this embodiment for portable devices.

It should be noted that the pixels within the LCD panel 51 may be driven in response to the second color-reduced image data 77 at odd frames, and driven in response to the first color-reduced image data 76 at even frames.

In summary, the controller/driver 53 in this embodiment, which makes use of the memory resource provided for data conversion of the vector data 55, achieves improvement of the image quality using the dithering and frame rate control with the reduced memory resource. The controller/driver 53 uses the first display memory 65 multipurposely, as both a work area for converting the vector data 55 into the corresponding bitmap data, and as a storage area storing the first color-reduced image data 76 for achieving frame rate control. This allows the controller/driver 53 to deal with the vector data 55, and to display enhanced-quality images on the LCD panel 51 with the reduced memory resource.

Additionally, the controller/driver 53 in this embodiment effectively achieves the improvement of the image quality through the dithering and frame rate control with reduced power consumption. Once generating and storing the first and second color-reduced image data 76 and 77 into the first and second display memory 65 and 66, the controller/driver 53 does not require receiving image data from the CPU 52 at every frame for achieving the frame rate control. Such operation effectively reduces the data transmission from the CPU 52 to the controller/driver 53 while the controller/driver 53 implements the frame rate control. The reduction in the data transmission is effective for reducing the power consumption of the controller/driver 53.

In this embodiment, the frame rate at which the LCD panel 51 is refreshed when the controller/driver 53 is placed into the bitmap data mode is higher than that when the controller/driver 53 is placed into the vector data mode. This effectively improves the image quality with reduced power consumption.

Fourth Embodiment

1. Display Device Structure

Figure 12:
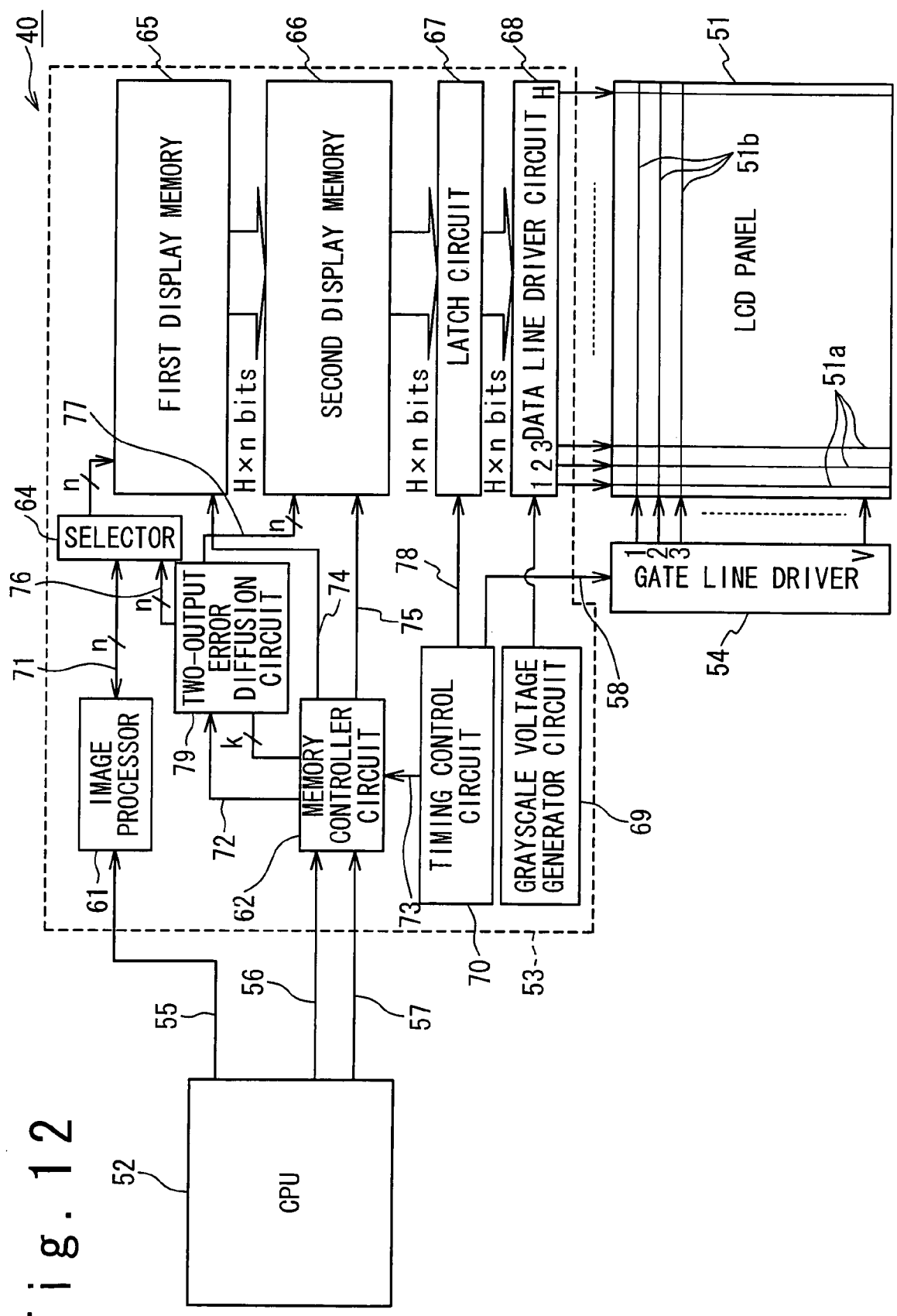
FIG. 12 is a block diagram illustrating an exemplary structure of a display device in a fourth embodiment.

FIG. 12 is a block diagram illustrating an exemplary structure of a display device 40 in accordance with a fourth embodiment of the present invention. The structure of the display device 40 in this embodiment is similar to that of the display device 30 in the third embodiment; the difference is that the display device 40 offers r-bit color-reduction for the bitmap data 56 through error diffusion in place of dithering. In order to achieve error diffusion, the display device 40 includes a two-output error diffusion circuit 79 in place of the two-output dither circuit 63. The two-output error diffusion circuit 79 uses the coordinate data 72 for achieving error diffusion of the bitmap data 56.

The two-output error diffusion circuit 79 applies error diffusion to the bitmap data 56 using different initial errors to develop a pair of color-reduced image data: first and second color-reduced image data 76 and 77. As is the case of the third embodiment, the first color-reduced image data 76 is stored into the first display memory 65, and the second color-reduced image data 77 is stored into the second display memory 66.

Figure 13:
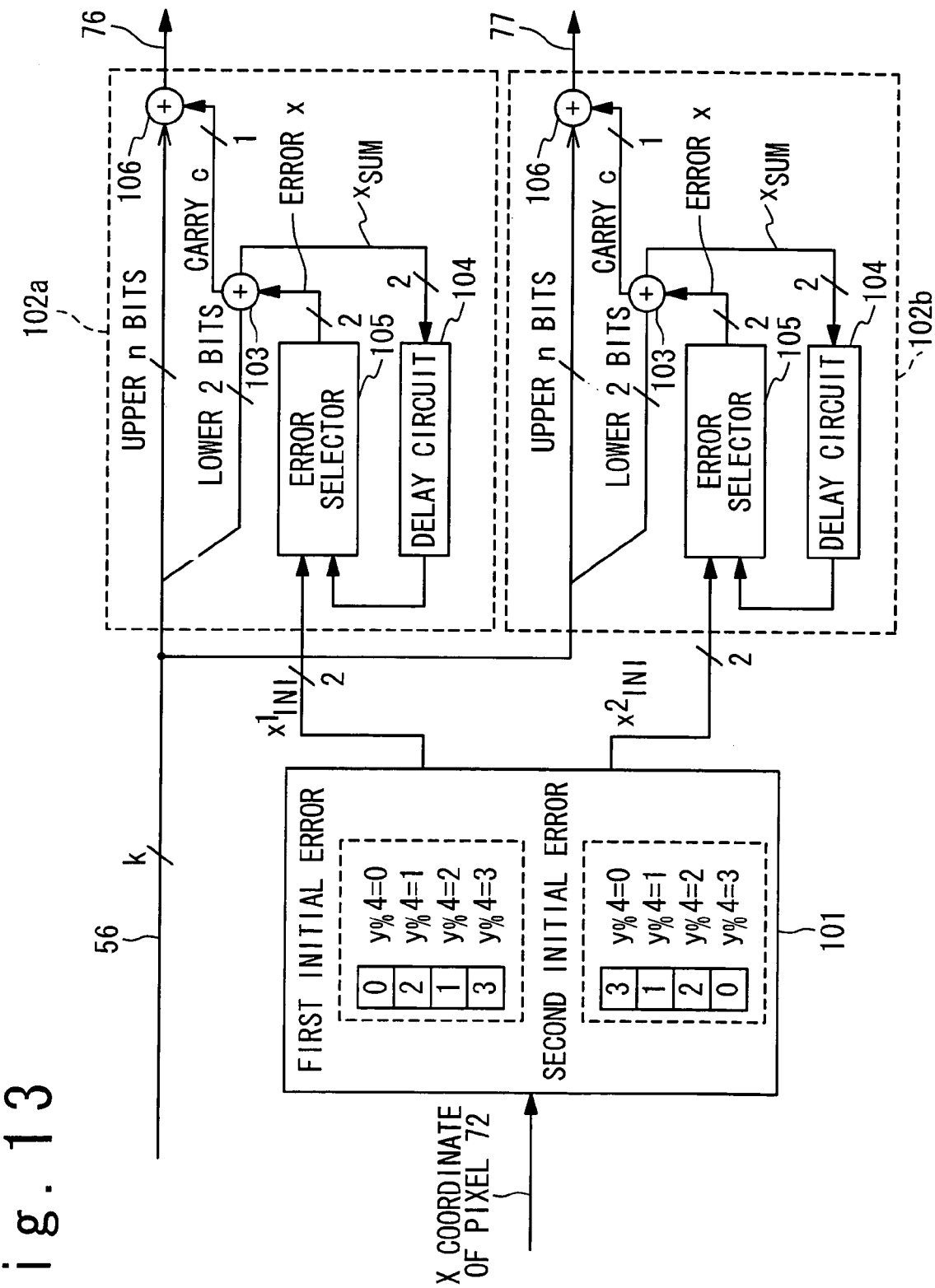
FIG. 13 is a block diagram illustrating an exemplary structure of an error diffusion circuit within the controller/driver in the fourth embodiment.

FIG. 13 illustrates an exemplary structure of the two-output error diffusion circuit 79. The structure of the two-output error diffusion circuit 79 is almost identical to that of the error diffusion circuit 28 in the second embodiment in exception that the selector 43 is removed from the two-output error diffusion circuit 79. The two-output error diffusion circuit 79 is composed of an initial error configuration circuit 101, and first and second error diffusion sections 102a and 102b. The initial error configuration circuit 101 generates first and second initial errors $x^1_{INI}$ and $x^2_{INI}$, in response to the y coordinates indicated by the coordinate data 72. The first and second initial errors $x^1_{INI}$ and $x^2_{INI}$ are different from each other, and dependent on the y coordinate of the interested pixel. In one example, the first and second initial errors $x^1_{INI}$ and $x^2_{INI}$ are set to "0" and "3", respectively, when the remainder obtained by dividing the coordinate y by 4 is zero, to "2" and "1" when the remainder is one, to "1" and "2", when the remainder is two, and to "3" and "0", respectively, when the remainder is three.

The first error diffusion section 102a applies error diffusion to the bitmap data 56 using the first initial error $x^1_{INI}$, received from the initial error configuration circuit 101, to generate the first color-reduced image data 76. In order to achieve error diffusion, the first error diffusion section 102a is composed of an adder 103, a delay circuit 104, an error selector 105, and another adder 106. The adder 103 adds a 2-bit error x received from the error selector 105 to the lower two bits of the bitmap data 56, and thereby develops a sum data $x_{SUM}$, and a carry C. The sum data $x_{SUM}$ is a 2-bit data representing the sum of the lower two bits of the input image data 47 and the error x. The delay circuit 104 delays the sum data $x_{SUM}$ by the delay time associated with one pixel processing. The error selector 105 selects the first initial error $x^1_{INI}$ as the error x to output the adder 103, when the x coordinate of the interested pixel is "1" (that is, when the interested pixel is the leftmost pixel), while selecting the output of the delay circuit 104 as the error x to output the adder 103. The adder 106 adds the carry c, received from the adder 103, to the upper n bits of the bitmap data 56. The output of the adder 106 is the first color-reduced image data 76, obtained by the error diffusion using the first initial error $x^1_{INI}$.

The second error diffusion section 102b applies error diffusion to the bitmap data 56 using the second initial error $x^2_{INI}$, received from the initial error configuration circuit 101. The structure of the second error diffusion section 102b is almost identical to that of the first error diffusion section 102a in the exception that the error selector 105 receives the second initial error $x^2_{INI}$ in place of the first initial error $x^1_{INI}$.

2. Display Device Operation

The operation of the display device 40 in this embodiment is almost identical to that of the display device 30 in the display device 30 in exception that the display device 40 generates the first and second color-reduced image data 76 and 77 through error diffusion in place of dithering.

When the controller/driver 53 is placed into the vector data mode, the controller/driver 53 is responsive to the vector data 55 for driving the LCD panel 51. Specifically, the image processor 61 converts the vector data 55 received from the CPU 52 into the corresponding bitmap data using the first display memory 65 as a work area to develop the corresponding bitmap data onto the first display memory 65. The developed bitmap data is transferred from the first display memory 65 to the second display memory 66, and stored into the second display memory 66. The data line driver circuit 68 receives the bitmap data from the second display memory 66, and drives the LCD panel 51 in response to the received bitmap data.

When the controller/driver 53 is placed into the bitmap data mode, on the other hand, the controller/driver 53 is responsive to the bitmap data 56 for driving the LCD panel 51. The controller/driver 53 enhances the image quality of the LCD panel 51 by using error diffusion and frame rate control. In detail, upon receiving the bitmap data 56 from the CPU 52, the memory controller circuit 62 within the controller/driver 53 transfers the bitmap data 56 to the two-output error diffusion circuit 79. The two-output error diffusion circuit 79 applies error diffusion to the bitmap data 56 using the first initial error $x^1_{INI}$ to develop the first color-reduced image data 76, and also applies error diffusion to the bitmap data 56 using the first initial error $x^2_{INI}$ to develop the second color-reduced image data 77. The first color-reduced image data 76 is stored into the first display memory 65, and the second color-reduced image data 77 is stored into the second display memory 66. At odd frames, the data line driver circuit 68 receives the first color-reduced image data 76 from the first display memory 65 through the second display memory 66, and drives the LCD panel 51 in response to the first color-reduced image data 76. At even frames, on the other hand, the data line driver circuit 68 receives the second color-reduced image data 77 from the second display memory 66, and drives the LCD panel 51 in response to the second color-reduced image data 77. Alternately using the color-reduced image data generated through error diffusion with different initial errors effectively reduces moiré potentially caused by error diffusion, and thereby achieves improvement of the image quality within the enhanced image quality region.

In summary, the controller/driver 53 in this embodiment, which makes use of the memory resource provided for dealing with the vector data 55, achieves improvement of the image quality using the error diffusion and the frame rate control with the reduced memory resource. Additionally, the controller/driver 53 in this embodiment effectively achieves the improvement of the image quality through the error diffusion and frame rate control with reduced power consumption.

The first and second initial errors $x^1_{INI}$ and $x^2_{INI}$, which are used for generating the first and second color-reduced image data 76 and 77, are determined so that the following equation is satisfied for the arbitrary pixel lines (that is, the arbitrary y coordinate of the pixels):

$$x^1_{INI} + x^2_{INI} = \text{const.}$$

Displaying the images generated using the initial errors $x^1_{INI}$ and $x^2_{INI}$ thus configured allows the diffusion errors to be uniformly distributed in terms of both the time and special domains. This effectively improves the image quality.

Although the invention has been described in its preferred form with a certain degree of particularity, it is apparent that the present disclosure of the preferred form may be modified or changed in the details of construction without departing from the scope of the invention as hereinafter claimed.

What is claimed is:

1. A controller/driver for driving main and sub display panels, comprising:
   first and second memory sections;
   a color reduction circuit; and
   a data line driver circuit,
   wherein, when said controller/driver is placed in a first mode, said color reduction circuit offers color-reduction under a first condition for input image data to develop first color-reduce image data, and offers color-reduction under a second condition different from said first condition for said input image data to develop second color-reduced image data, and said first and second memory sections store therein said first and second color-reduced image data, respectively, and
   wherein, when said controller/driver is placed in said first mode, said data line driver circuit drives one of said main and sub display panels in response to one of said first and second color-reduced image data at a first frame, and drives said one of said main and sub display panels in response to another of said first and second color-reduced image data at a second frame following said first frame, wherein, when said controller/driver is placed in a second mode, said first memory section stores therein main image data associated with a main image to be displayed on said main display panel, and said second memory section stores therein sub image data associated with a sub image to be displayed on said sub display panel, and wherein, when said controller/driver is placed in said second mode, said data line driver circuit drives said main display panel in response to said main image data stored in said first memory section, and drives said sub display panel in response to said sub image data stored in second memory section.

2. The controller/driver according to claim 1, wherein said color-reduction under said first condition includes dithering using a first dither matrix, and wherein said color-reduction under said second condition includes dithering using a second dither matrix different from said first dither matrix.

3. The controller/driver according to claim 2, wherein first and second dither matrix are each an (r, r) bayer matrix, r being a natural number equal to or more than 2, and wherein an (i, j) element $a^1_{ij}$ of said first dither matrix, and an (i, j) element $a_{2ij}$ of said second dither matrix satisfy the following equation:

$$a^1_{ij} + a^2_{ij} = \text{const.},$$

for arbitrary combinations of i, j, which are each a natural number equal to or less than r.

4. The controller/driver according to claim 1, wherein said color-reduction under said first condition includes error diffusion using a first initial error, and wherein said color-reduction under said second condition includes error diffusion using a second initial error different from said first initial error.

5. The controller/driver according to claim 4, wherein said first and second initial errors satisfies the following equation:

$$x^1_{INI} + x^2_{INI} = \text{const.},$$

for arbitrary lines of pixels within said one of said main and sub display panels, where $x^1_{INI}$ is said first initial error, and $x^2_{INI}$ is said second initial error.

6. The controller/driver according to claim 1, wherein a first frame rate in a case when said controller/driver is placed into said first mode is higher than a second frame rate in a case when said controller/driver is placed into said second mode.

7. A controller/driver for driving a display panel, comprising:
first and second memory sections;
a color-reduction circuit;
an image processor; and
a data line driver circuit,
wherein, when said controller/driver is placed into a first mode, said color-reduction circuit offers color-reduction under a first condition for input image data in a bitmap form to develop first color-reduced image data, and offers color-reduction under a second condition different from said first condition for said input image data to develop second color-reduced image data, and said first and second memory sections store therein said first and second color-reduced image data, respectively, wherein, when said controller/driver is placed into said first mode, said data line driver circuit drives said display panel in response to one of said first and second color-reduced image data at a first frame, and drives said display panel in response to another of said first and second color-reduced image data at a second frame following said first frame, wherein, when said controller/driver is placed into a second mode, said image processor converts another input image data in a form different from said bitmap form into corresponding bitmap data using said first memory section as a work area, and develops said corresponding bitmap data onto said first memory section, and said second memory section receives said bitmap data from said first memory section to store therein, and wherein, when said controller/driver is placed into said second mode, said data line driver circuit drives said display panel in response to said bitmap data stored in said second memory section.

8. The controller/driver according to claim 7, wherein said color-reduction under said first condition includes dithering using a first dither matrix, and wherein said color-reduction under said second condition includes dithering using a second dither matrix different from said first dither matrix.

9. The controller/driver according to claim 7, wherein said color-reduction under said first condition includes error diffusion using a first initial error, and wherein said color-reduction under said second condition includes error diffusion using a second initial error different from said first initial error.

10. A display device comprising:
a processor;
a display panel; and
a controller/driver driving said display panel in response to input image data received from said processor, said input image data is represented in a bitmap form,
wherein said controller/driver includes:
a color-reduction circuit generating first color-reduced image data through applying color reduction to said input image data under a first condition, and generating second color-reduced image data through applying color reduction to said input image data under a second condition different from said first condition,
a first memory section storing said first color-reduced image data,
a second memory section storing said second color-reduced image data, and
a data line driver circuit driving said display panel in response to one of said first and second color-reduced image data at a first frame, and driving said display panel in response to another of said first and second color-reduced image data at a second frame following said first frame.

11. The display device according to claim 10, wherein said color-reduction under said first condition includes dithering using a first dither matrix, and wherein said color-reduction under said second condition includes dithering using a second dither matrix different from said first dither matrix.

12. The display device according to claim 10, wherein said color-reduction under said first condition includes error diffusion using a first initial error, and wherein said color-reduction under said second condition includes error diffusion using a second initial error different from said first initial error.

13. A method of operating a controller/driver, said method comprising:
externally receiving input image data;
developing first color-reduced image data through applying color-reduction to said input image data under a first condition;
storing said first color-reduced image data into a first memory section;
developing second color-reduced image data through applying color-reduction to said input image data under a second condition different from said first condition;
storing said second color-reduced image data into a second memory section;
driving a first display panel in response to one of said first and second color-reduced image data at a first frame;
driving said first display panel in response to another of said first and second color-reduced image data at a second frame following said first frame;
storing first image data associated with an image to be displayed on said first display panel;
storing second image data associated with an image to be displayed on a second display panel;
driving said first display panel in response to said first image data; and
driving said second display panel in response to said second image data.

14. A method of operating a controller/driver, said method comprising:
externally receiving first input image data in a bitmap form;
developing first color-reduced image data through applying color-reduction to said first input image data under a first condition;
storing said first color-reduced image data into a first memory section;
developing second color-reduced image data through applying color-reduction to said first input image data under a second condition different from said first condition;
storing said second color-reduced image data into a second memory section;
driving a display panel in response to one of said first and second color-reduced image data at a first frame;
driving said display panel in response to another of said first and second color-reduced image data at a second frame following said first frame;
externally receiving second input image data in a form different from said bitmap form;
converting said second input image data into corresponding bitmap data using said first memory section as a work area to thereby develop said corresponding bitmap data onto said first memory section;
transferring said corresponding bitmap data from said first memory section to said second memory section; and
driving said display panel in response to said bitmap data stored in said second memory section.

15. A method for operating a display device comprising a processor, a controller/driver, and a display panel, said method comprising:
transferring input image data from said processor to said controller/driver;
generating first color-reduced image data through applying color-reduction to said transferred input image data under a first condition;
storing said first color-reduced image data into a first memory section within said controller/driver;
generating second color-reduced image data through applying color-reduction to said transferred input image data under a second condition different from said first condition;
storing said second color-reduced image data into a second memory section within said controller/driver;
driving said display panel in response to said first color-reduced image data stored in said first memory section at a first frame; and
driving said display panel in response to said second color-reduced image data stored in said second memory section at a second frame following said first frame.

* * * * *